(12) United States Patent
Harrison

(10) Patent No.: US 7,554,025 B2
(45) Date of Patent: Jun. 30, 2009

(54) VISUAL CHORD KEYBOARD INSTRUCTIONAL METHOD

(76) Inventor: Winston Harrison, 235 Adams St., Apt. 11K, Brooklyn, NY (US) 11201

( * ) Notice: Subject to any disclaimer, the term of this patent is extended or adjusted under 35 U.S.C. 154(b) by 1054 days.

(21) Appl. No.: 10/841,881

(22) Filed: May 9, 2004

(65) Prior Publication Data

US 2004/0224295 A1 Nov. 11, 2004

Related U.S. Application Data

(60) Provisional application No. 60/468,793, filed on May 9, 2003.

(51) Int. Cl.
*G09B 15/00* (2006.01)
(52) U.S. Cl. .................................................. 84/470 R
(58) Field of Classification Search ............... 84/470 R, 84/471 R, 472–475, 471 SR, 476, 478, 479 R, 84/480, 481, 479 S
See application file for complete search history.

(56) References Cited

U.S. PATENT DOCUMENTS 5,415,071 A * 5/1995 Davies ................... 84/471 SR
6,388,182 B1 * 5/2002 Bermudez ................ 84/477 R

* cited by examiner

*Primary Examiner*—Kimberly R Lockett
(74) *Attorney, Agent, or Firm*—Sandra M. Kotin

(57) ABSTRACT

Shapes formed by various series of interconnected straight lines representing lines between finger positions forming chords on musical keyboards form a system and method for learning finger positioning to form chords and finger movements to change chords on a musical keyboard. All thirty-six triads can be formed by eight triad shapes for forming finger positions to create the triad chords by moving the finger positions to different locations along a keyboard. All four finger chords can be formed from sixteen four finger chord shapes. Chord trees are families of chords formed by moving one or more fingers from each triad chord or four finger chord to raise or lower notes, merge two notes into one, or split one note into two notes thereby forming all new chords and harmonies.

21 Claims, 49 Drawing Sheets

These Are The Shapes For Diatonic Triads

● Black Key
○ White Key
♭ Flat
° Diminished

MAJOR AND MINOR TRIADS

Regular Triads (18)

C, F, G, Am, Dm, Em

A, D, E, Cm, Fm, Gm

A♭, D♭, E♭, G♭m, A♭m, D♭m

Irregular Triads (6)

B

Bm

B♭

B♭m

C Major

A Major

DIMINISHED TRIADS

Regular (6)

D°, A°, E°

D♭°, A♭°, G♭°

Irregular (6)

C°, G°

F°

B°

E♭°, B♭°

G♭, E♭m

Fig. 1A
These Are The Shapes For Diatonic Triads
●     Black Key
○     White Key
♭     Flat
°     Diminished
MAJOR AND MINOR TRIADS
Regular Triads (18)
C, F, G, Am, Dm, Em     ○ ○ ○     
A, D, E, Cm, Fm, Gm     ○ ● ○     
A♭, D♭, E♭, G♭m, A♭m, D♭m     ● ○ ●     
Irregular Triads (6)
B     ○ ● ●     
Bm     ○ ○ ●     
B♭     ● ○ ○     
B♭m     ● ● ○     
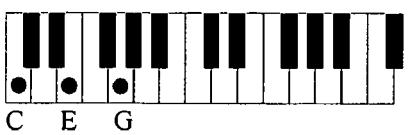
C Major
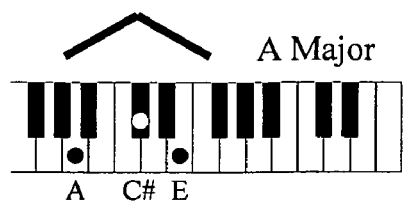
A Major

Fig. 1B
Gb, Ebm   
DIMINISHED TRIADS
Regular (6)
D°, A°, E°   
Db°, Ab°, Gb°   
Irregular (6)
C°, G°   
F°   
B°   
Eb°, Bb°   

Fig. 2A

Stacking Thirds to form Chords

M = Major $3^{rd}$
m = minor $3^{rd}$
d = diminished $3^{rd}$
A = augmented $3^{rd}$
○   Note - Black and White
®   Root of chord

| | | | | | Example | |
|---|---|---|---|---|---|---|
| Mm | Major Triad | ® | ○ | ○ | | C |
| | | | | | | |
| mM | Minor | ® | ○ | ○ | | Cm |
| mM | $6^{th}$ N/5 | ○ | ® | ○ | | E♭6 |
| | | | | | | |
| mm | Diminished, | ® | ○ | ○ | | Cdim |
| mm | Minor $6^{th}$ N/5 | ○ | ® | ○ | | E♭m6 |
| | | | | | | |
| MM | Aug $5^{th}$ | ® | ○ | ○ | | C+ |
| Md | -5 | ® | ○ | ○ | | C-5 |
| | | | | | | |
| MmM | Major $7^{th}$ | ® | ○ | ○ | ○ | Cmaj7 |
| MmM | Minor $9^{t}$ | ○ | ○ | ○ | ○ | Am9 |
| MmM | $13^{th}$ | ○ | ○ | ○ | ○ | D13 |
| | | | | | | |
| MMm | Maj7+5 | ® | ○ | ○ | ○ | Cmaj7+5 |
| | | | | | | |
| Mmm | Dominant $7^{th}$ | ® | ○ | ○ | ○ | C7 |
| Mmm | Minor $7^{th}$ -9 | ○ | ○ | ○ | ○ | Am7-9 |
| Mmm | 11#5 | ○ | ○ | ○ | ○ | D11#5 |
| | | | | | | |
| mMm | $6^{th}$ | ○ | ® | ○ | ○ | E♭6 |
| mMm | Minor $7^{th}$ | ® | ○ | ○ | ○ | Cm7 |
| mMm | Major $9^{th}$ | ○ | ○ | ○ | ○ | A♭maj9 |
| mMm | $11^{th}$, $9^{th}$sus4 | ○ | ○ | ○ | ○ | F11,(F9sus4) |
| | | | | | | |
| mmm | Dim $7^{th}$ | ® | ○ | ○ | ○ | Cdim7 |
| mmm | 7-9 | ○ | ○ | ○ | ○ | D7-9 |
| | | | | | | |
| mMM | Minor $7^{th}$+, ½ dim | ® | ○ | ○ | ○ | Cm7+ |
| mMM | Minor $9^{th}$ -5 | ○ | ○ | ○ | ○ | Am9-5 |
| mMM | 13-9 | ○ | ○ | ○ | ○ | D13-9 |

Fig. 2B

| | | | | | | |
|---|---|---|---|---|---|---|
| mmM | Minor 6th | ○ | ® | ○ | ○ | Gm6 |
| mmM | Minor 7-5 | ® | ○ | ○ | ○ | Em7-5 |
| mmM | 9th | ○ | ○ | ○ | ○ | C9 |
| mmM | 11th♭9, 7-9sus4 | ○ | ○ | ○ | ○ | A11♭9,(A7-9sus4) |
| | | | | | | |
| MMd | 7+5 | ® | ○ | ○ | ○ | C7+5 |
| MMd | 9th -5 | ○ | ○ | ○ | ○ | F#9-5 |
| | | | | | | |
| MdM | 7-5 | ® | ○ | ○ | ○ | C7-5 |
| MdM | 9th+5 | ○ | ○ | ○ | ○ | A♭9+5 |
| M d M | 9+5 | ○ | ○ | ○ | ○ | D9+5 enharmonic |
| | | | | | | |
| dMm | 7th | ○ | ® | ○ | ○ | B♭7 |
| dMm | 11#5,m7-9 | ○ | ○ | ○ | ○ | C11#5,Gm7-9 |
| | | | | | | |
| ddm | Add9th | ® | ○ | ○ | ○ | Cadd9 |
| | | | | | | |
| AdM | m9+5 | ○ | ○ | ○ | ○ | Cm9+5 |
| | | | | | | |
| MdA | Maj7-5 | ® | ○ | ○ | ○ | Cmaj7-5 |
| | | | | | | |
| Adm | 7sus4 | ® | ○ | ○ | ○ | A7sus4 |
| mdA | 6/9 | ○ | ○ | ○ | ○ | C6/9 |
| | | | | | | |
| md½ (odd) | 7/6 | ○ | ○ | ○ | ○ | C7/6 |

Chords are formed by stacking major and minor 3rd but they do not have to be in root form.

Inverted 3rd in 4-note chords                                                                 Example

| | | | | | | |
|---|---|---|---|---|---|---|
| M‖M | Major 7th | ○ | ○ | ® | ○ | Cmaj7 |
| M‖M | Minor 9th | ○ | ○ | ○ | ○ | Am9 |
| M‖M | 13th | ○ | ○ | ○ | ○ | D13 |
| | | | | | | |
| m d M | 7th | ○ | ○ | ® | ○ | C7 |
| m d M | m7-9 | ○ | ○ | ○ | ○ | Am7-9 |
| m d M | 11#5 | ○ | ○ | ○ | ○ | D11#5 |
| | | | | | | |
| m d m | 6th | ○ | ○ | ○ | ® | E♭6 |
| m d m | Minor 7th | ○ | ○ | ® | ○ | Cm7 |
| m d m | Major 9th | ○ | ○ | ○ | ○ | A♭maj9 |
| m d m | 11th, 9sus4 | ○ | ○ | ○ | ○ | F11,F9sus4 |

Fig. 2C

| | | | | | | |
|---|---|---|---|---|---|---|
| mmm | Dim 7th, | ® | ® | ® | ® | Cdim7 |
| mmm | 7-9 | ○ | ○ | ○ | ○ | D7-9 |
| | | ○ | ○ | | | |
| M‖m | Minor 7th+ | ○ | ○ | ® | ○ | Cm7+ |
| M‖m | Minor 9th -5 | ○ | ○ | ○ | ○ | Am9-5 |
| M‖m | 13-9 | ○ | ○ | ○ | ○ | D13-9 |
| | | ○ | ○ | | | |
| M d m | Minor 6th | ○ | ○ | ○ | ® | Gm6 |
| M d m | Minor 7-5 | ○ | ○ | ® | ○ | Em7-5 |
| M d m | 9th | ○ | ○ | ○ | ○ | C9 |
| M d m | 11th b9,7-9sus4 | ○ | ○ | ○ | ○ | A11b9,(A7-9sus4) |
| | | ○ | ○ | | | |
| d d M | 7+5 | ○ | ○ | ® | ○ | C7+5 |
| d d M | 9th -5 | ○ | ○ | ○ | ○ | F#9-5 |
| | | ○ | ○ | | | |
| M d M | 7-5 | ○ | ○ | ® | ○ | C7-5 |
| M d M | 9+5 | ○ | ○ | ○ | ○ | Ab9+5 |
| M d M | 9+5 | ○ | ○ | ○ | ○ | D9+5 enharmonic |
| | | ○ | ○ | | | |
| mmd | 7th | ○ | ○ | ○ | ® | Bb7 |
| mmd | 11#5 | ○ | ○ | ○ | ○ | C11#5,Gm7-9 |
| | | ○ | ○ | ○ | ○ | |
| M‖A | m9+5 | ○ | ○ | ○ | ○ | Cm9+5 |
| | | ○ | ○ | ○ | ○ | |
| M‖A | Maj7-5 | ○ | ○ | ○ | ○ | Cmaj7-5 |
| | | ○ | ○ | ○ | ○ | |
| m‖M | Maj7+5 | ○ | ○ | ○ | ○ | Cmaj7+5 |
| | | ○ | ○ | | | |
| m d A | 7sus4 | ○ | ○ | ® | ○ | A7sus4 |
| A d m | 6/9 | ○ | ○ | ○ | ○ | C6/9 |
| Add | Add9th | ○ | ® | ○ | ○ | Cadd9 |
| md½ | 7/6 | ○ | ○ | ○ | ○ | C7/6 |

The dim7th is an equal interval chord, any note can be the root

The 7-9 is also an equal interval chord, any chord tone can be the b9

Fig. 3A

The C Major Family of Chords

Simple Chords (3-note) Generated from the C Major Triad

```
     A#      C#    D#      F#    G#
A    B   C   D    E   F    G    A
     Bb  Cb  Db   Eb  Fb   Gb   Ab
```

|   |   |   |   |   |   |   |   |   |   |   |
|---|---|---|---|---|---|---|---|---|---|---|
|   |   |   |   | C |   | E |   | G |   |   |
|   |   |   |   | C |   | E |   | G |   |   |
|   |   |   |   | C |   | E |   | G |   |   |
|   |   |   |   | C |   | E |   | G |   |   |

|   |   | R | $3^{rd}$ | $5^{th}$ |
|---|---|---|---|---|
|   |   | C | E | G |

| Chord notes | | | Interval | Chord name |
|---|---|---|---|---|
| B ← | E | G | - ½ | Em |
| B ← | E | G | - ½ | Cmaj7    N/R |
| B ← | E | G | - ½ | C#m7-5   N/R |
| B ← | E | G | - ½ | G6 N/5, F#11b9 N/5 |
| B ← | E | G | - ½ | A9        N/3 |
| B ← | E | G | - ½ | Am9       N/3 |
| B ← | E | G | - ½ | F#11b9    N/5 |
| → C# | E | G | + ½ | Em6       N/5 |
| → C# | E | G | + ½ | C#dim |
| → C# | E | G | + ½ | A#dim7    N/R  ??? |
| → Db | Fb | Abb | + ½ | Bbdim7   N/R enhar |
| → Db | Fb | Abb | + ½ | Gb7-9    N/3 enhar |
| → C# | E | G | + ½ | A7        N/R |
| Bb ← | E | G | - 1 | Gm6       N/5 |
| Bb ← | E | G | - 1 | Edim |
| Bb ← | E | G | - 1 | C#dim7   N/R |
| Bb ← | E | G | - 1 | C7 N/R, Am7-9 N/3 |
| → D | E | G | + 1 | A7sus     N/R |

|   |   | R | $3^{rd}$ | $5^{th}$ |
|---|---|---|---|---|
|   |   | C | E | G |

| Chord notes | | | Interval | Chord name |
|---|---|---|---|---|
| C | Eb ← | G | - ½ | Cm |
| C | Eb ← | G | - ½ | Abmaj7    N/R |
| C | Eb ← | G | - ½ | Am7-5     N/R |
| C | Eb ← | G | - ½ | Eb6       N/5 |
| C | Eb ← | G | - ½ | F9        N/3 |
| C | Eb ← | G | - ½ | Fm9       N/3 |
| C | Eb ← | G | - ½ | D11b9     N/5 |

Fig. 3B

|   |   |   |   |   |   |   | R | 3rd | 5th |   |   |
|---|---|---|---|---|---|---|---|-----|-----|---|---|
|   |   |   |   |   |   |   | C | E   | G   |   |   |
| C |   |   | → | F |   | G |   |     | + ½ | Csus |   |
| C |   |   |   | F# |  | G |   |     | + 1 | D7sus4 |   |
| C |   |   | E |   | G♭ | ← |   |     | − ½ | C−5 |   |
| C |   |   | E |   | F# | ← |   |     | − ½ | D9 | N/5 |
| C |   |   | E |   | F# | ← |   |     | − ½ | Am6 | N/R |
| C |   |   | E |   | →  | G# |   |    | + ½ | C+5 |   |
| C |   |   | E |   | →  | A |   |     | + 1 | Am |   |
| C |   |   | E |   | →  | A |   |     | + 1 | Fmaj7 | N/R |
| C |   |   | E |   | →  | A |   |     | + 1 | F#m7−5 | N/R |
| C |   |   | E |   | →  | A |   |     | + 1 | C6 | N/5 |
| C |   |   | E |   | →  | A |   |     | + 1 | D9 | N/3 |
| C |   |   | E |   | →  | A |   |     | + 1 | Dm9 | N/3 |
| C |   |   | E |   | →  | A |   |     | + 1 | B11♭9 | N/5 |

|   |   |   |   |   |   |   | R | 3rd | 5th |   |   |
|---|---|---|---|---|---|---|---|-----|-----|---|---|
|   |   |   |   |   |   |   | C | E   | G   |   |   |
| B | ← |   | D# | ← |   | F## | − ½ | − ½ |   | B+5 |   |
| B | ← | D | ← |   |   | G | − ½ | − 1 |   | G |   |
| B | ← |   | → | F |   | G | − ½ | + ½ |   | G7 N/5 |   |
|   | → | D♭ |   | → | F | A♭♭ | + ½ | + ½ |   | D♭−5 |   |
|   | → | D♭ | E♭ | ← |   | G | + ½ | − ½ |   | E♭7 N/5 |   |

|   |   |   |   |   |   |   | R | 3rd | 5th |   |   |
|---|---|---|---|---|---|---|---|-----|-----|---|---|
|   |   |   |   |   |   |   | C | E   | G   |   |   |
| C |   |   | E♭ | ← | G♭ | ← |   | − ½ | − ½ | Cdim |   |
| C |   |   | E♭ | ← | →  | A♭ |   | − ½ | + ½ | A♭ |   |
| C |   |   | →  | F | →  | A♭ |   | + ½ | + ½ | Fm |   |
| C |   |   | →  | F | →  | A |   | + ½ | + 1 | F |   |
| C |   |   | →  | F | G♭ | ← |   | + ½ | − ½ | A♭7/6 N/5 |   |

|   |   |   |   |   |   |   | R | 3rd | 5th |   |   |
|---|---|---|---|---|---|---|---|-----|-----|---|---|
|   |   |   |   |   |   |   | C | E   | G   |   |   |
| C♭ | ← |   | F♭ |   | G♭ | ← | − ½ | − ½ |   | C♭sus |   |
| B | ← |   | E |   | → | G# | − ½ | + ½ |   | E |   |
|   | → | D♭ | F♭ |   | ← | A♭ | + ½ | + ½ |   | D♭m |   |
|   | → | C# | E |   | F# | ← | + ½ | − ½ |   | A6 N/R |   |
| B♭ | ← |   | E |   | → | G# | − 1 | + ½ |   | C7+5 N/R,F#9 |   |

Fig. 3C

| | | | | | | | R | 3rd | 5th | |
|---|---|---|---|---|---|---|---|---|---|---|
| | | | | | | | C | E | G | |
| B♭ | ← | | | E | | G♭ ← | -1 | | -½ | C7-5 N/R |
| | | B ← | | D# ← | | F# ← | -½ | -½ | -½ | B |
| | | B ← | D | | ← F | ← | -½ | -1 | -1 | Bdim,G7 N/R |
| | | C♭ ← | | E♭ ← | | → A♭ | -½ | -½ | +½ | A♭m |
| | | C♭ ← | | → F | | → A♭ | -½ | +½ | +½ | Fdim |
| | | B ← | | → F | | G♭ ← | -½ | +½ | -½ | ? |
| | | | → D♭ | | → F | → A♭ | +½ | +½ | +½ | D♭ |
| | | | → D♭ | | → F | G♭ ← | +½ | +½ | -½ | E♭m9,G♭maj7 N/3 |
| | | | → C# | D# ← | | F# ← | +½ | -½ | -½ | Badd9 N/R |
| | | | → D♭ | E♭ ← | | → A♭ | +½ | -½ | +½ | A♭sus |
| | | B ← | D | ← | | → G# | -½ | -1 | +½ | E7 |
| | | B ← | D | ← | F# | ← | -½ | -1 | -½ | Gmaj7 |
| | | B ← | D | ← F | | ← | -½ | -1 | -1 | G7,Bdim |
| | | C♭ ← | | → | G♭ → | A♭ | -½ | +1 | +½ | D♭7sus4 |
| B♭ | ← | | E♭ ← | | G♭ ← | | -1 | -½ | -½ | E♭m |
| B♭ | ← | | E♭ ← | | → A♭ | | -1 | -½ | +½ | E♭sus |
| B♭ | ← | | → F | | → A♭ | | -1 | +½ | +½ | D♭6 N/R |
| | | → D | → F | | → A♭ | | +1 | +½ | +½ | Ddim |
| | | → D | → F | | → | A +1 | +½ | +1 | Dm |
| | | → D | → F | G♭ ← | | +1 | +½ | -½ | ? |
| | | → D | E♭ ← | G♭ ← | | +1 | -½ | -½ | E♭m7+ N/5 |
| | | → D | E♭ ← | → A♭ | | +1 | -½ | +½ | B♭7sus4 N/5 ?? |

Fig. 4

The C Major Family of Chords

Full Chord Generated from Splitting the Root OR 3rd OR 5th of the C Major Triad

|  |  |  |  | A# |  | C# | D# |  | F# | G# |  |  |  |
|---|---|---|---|---|---|---|---|---|---|---|---|---|---|
| A |  | B | C |  | D |  |  | E | F |  | G | A | Tone |
|  |  |  |  | Bb | Cb | Db |  | Eb | Fb | Gb |  | Ab | Dn/Up |

Root (C)

| | | | | | | | |
|---|---|---|---|---|---|---|---|
|  |  | C |  | E |  | G | - 0  C + 1 | Cadd9 |
|  |  | C | D | E |  | G | - ½ C + ½ | Em6, C#m7-5, A9, F#11b9 |
|  | B ↔ C# |  | E |  | G | - ½ C + ½ | Em6, C#m7-5, A9, F#11b9 |
|  | Cb ↔ Db |  | Fb |  | Abb | - ½ C + ½ | Fbm6, Dbm7-5, A9, Gb11b9 |
|  | B ↔ | D | E |  | G | - ½ C + 1 | G6, Em7, Cmaj9, A11 |
| Bb ↔ | D | E |  | G | -1  C + 1 | Gm6, Em7-5, C9, A11b9 |
| A# ↔ C# |  | E |  | G | -1  C + ½ | , F#7-9 |
| Bb ↔ C# |  | E |  | G | -1  C + ½ | C#dim7, A7-9 |
| Bb ↔ Db |  | E |  | G | -1  C + ½ | Edim7, C7-9 |
| Bb ↔ Db |  | Fb |  | G | -1  C + ½ | Gdim7, Eb7-9 |
| Bb ↔ Db |  | Fb |  | Abb | -1  C + ½ | Bbdim7, Gb7-9 |
| Cbb ↔ Db |  | Fb |  | Abb | -1  C + ½ | Dbdim7 |

5th (G)

|  | C |  | E |  | G |  |  |
|---|---|---|---|---|---|---|---|
|  | C |  | E | F# ↔ Ab |  | - ½ G + ½ | D9-5 |
|  | C |  | E | Gb ↔ Ab |  | - ½ G + ½ | Ab7+5 |
|  | C |  | E | F# ↔ | A | - ½ G + 1 | Am6, F#m7-5, D9, B11b9 |
|  | C |  | E  F | ↔ Ab |  | - 1 G + ½ | Fm7+, Dm9-5, G13-9 |
|  | C |  | E  F | ↔ | A | - 1 G + 1 | Fmaj7, Dm9, G13 |

3rd (E)

|  | C |  | E |  | G |  |  |
|---|---|---|---|---|---|---|---|
|  | C | Eb ↔ F |  | G | -½ E + ½ | Cmsus4    ??? |
|  | C | D# ↔ | F# | G | -½ E + 1 | ? |
|  | B# | D | ↔ | F# | G | - 1 E + 1 | Em9+5 |
|  | C | D | ↔ F |  | G | - 1 E + ½ | G7sus4, Bb6/9 |

Fig. 5A

The C Major Family of Chords

Full Chord Generated from Splitting the Root AND 3$^{rd}$, Root AND 5$^{th}$, 3$^{rd}$ AND 5$^{th}$ of the C Major Triad

```
    A#        C#      D#        F#     G#
A   B    C    D    E  F    G    A      Tone
    Bb        Db      Eb        Gb     Ab      Dn/Up Split Root and 5th
         C              E          G
```

| Root | | 3rd | | 5th | | Formula | Chord |
|---|---|---|---|---|---|---|---|
| B | ↔ | C# | | F# | ↔ G# | −½ C + ½ / −½ G + ½ | C#7sus4, E6/9 |
| B |   | C# | | Gb |   Ab | −½ C + ½ / −½ G + ½ | ? |
| B |   | C# | F | Ab |        | −½ C + ½ / −1 G + ½ | ? |
| B | ↔ | C# | F | ↔ G# |     | −½ C + ½ / −1 G + ½ | C#7 |
| B |   | C# | | F# |   A    | −½ C + ½ / −½ G +1 | ? |
| B |   | C# | | Gb |   A    | −½ C + ½ / −½ G +1 | ? |
| B | ↔ | C# | F | ↔ A |     | −½ C + ½ / −1 G +1 | C#7+5 |
| Cb | ↔ | Db | | Gb | ↔ Ab | −½ C + ½ / −½ G + ½ | Db7sus4 |
| B | ↔ | C# | | F# | ↔ G# | −½ C + ½ / −½ G + ½ | E6/9   enharmonic |
| B |   | Db | | F# |   Ab | −½ C + ½ / −½ G + ½ | ? |
| Cb | ↔ | Db | F | ↔ Ab |   | −½ C + ½ / −1 G + ½ | Db7, Bbm7-9 |
| B | ↔ | Db | F | ↔ Ab |   | −½ C + ½ / −1 G + ½ | Eb11#5   enhar |
| B |   | Db | F | G# |        | −½ C + ½ / −1 G + ½ | ? |
| B |   | Db | | F# |   A    | −½ C + ½ / −½ G + 1 | ? |
| B |   | Db | | Gb |   A    | −½ C + ½ / −½ G + 1 | ? |
| Cb | ↔ | Db | F | ↔ A |    | −½ C + ½ / −1 G + 1 | Db7+5 |
| B | ↔ | Db | F | ↔ A |    | −½ C + ½ / −1 G + 1 | G9-5 |
| B | ↔ | D | | F# | ↔ G# | −½ C + 1 / −½ G + ½ | Bm6, E9 |
| Cb | ↔ | Ebb | | Gb | ↔ Ab | −½ C + 1 / −½ G + ½ | Abm7-5, Db11b9 enhar. |
| B | ↔ | D | | F# | ↔ A | −½ C + 1 / −½ G + 1 | D6, Bm7, Gmaj9, E11 |
| B |   | D | | Gb |   A | −½ C + 1 / −½ G + 1 | ? |
| B | ↔ | D | F | ↔ G# |   | −½ C + 1 / −1 G + ½ | E7b9, G#dim7 |
| Cb | ↔ | Ebb | Gbb | ↔ Ab | | −½ C + 1 / −1 G + ½ | Abdim7 enhar. |
| B | ↔ | D | F | ↔ Ab |   | −½ C + 1 / −1 G + ½ | G7b9, Bdim7 |
| Cb | ↔ | D | F | ↔ Ab |   | −½ C + 1 / −1 G + ½ | Bb7b9, Ddim7 |
| Cb | ↔ | Ebb | F | ↔ Ab |  | −½ C + 1 / −1 G + ½ | Db7b9, Fdim7 |
| B | ↔ | D | F | ↔ A |    | −½ C + 1 / −1 G + 1 | Dm6, Bm7-5, G9, E11b9 |

Fig. 5B

| | C | | E | G | | | |
|---|---|---|---|---|---|---|---|
| B♭ | C# | | | G♭ | A♭ | -1  C + ½ /- ½ G + ½ | |
| B♭ | C# | | | F# | A♭ | -1  C + ½ /- ½ G + ½ | |
| B♭ | C# | | | G♭ | A | -1  C + ½ /- ½ G + 1 | |
| B♭ | C# | | | F# | A | -1  C + ½ /- ½ G + 1 | |
| B♭ | ↔ C# | | F | ↔ A♭ | | -1  C + ½ /- 1 G + ½ | C#6 |
| B♭ | C# | | F | | G# | -1  C + ½ /- 1 G + ½ | ? |
| | | | | | | | |
| B♭ | ↔ D♭ | | | G♭ | ↔ A♭ | -1  C + ½ /- ½ G + ½ | G♭ add9 |
| B♭ | D♭ | | | F# | A♭ | -1  C + ½ /- ½ G + ½ | |
| B♭ | D♭ | | | G♭ | A | -1  C + ½ /- ½ G + 1 | |
| B♭ | D♭ | | | F# | A | -1  C + ½ /- ½ G + 1 | |
| B♭ | ↔ D♭ | | F | ↔ A♭ | | -1  C + ½ /- 1 G + ½ | D♭6,B♭m7,G♭maj9,E♭11 |
| B♭ | D♭ | | F | | G# | -1  C + ½ /- 1 G + ½ | ? |
| B♭ | ↔ D♭ | | F | ↔ | A | -1  C + ½ /- 1 G + 1 | B♭m7+,Gm9-5,C13♭9 |
| | | | | | | | |
| B♭ | ↔ D | | | F# | ↔ A♭ | -1  C + 1/ - ½ G + ½ | B♭7+5 |
| B♭ | ↔ D | | | F# | ↔ G# | -1  C + 1/ - ½ G + ½ | E9-5 |
| | | | | | | | |
| B♭ | D | | | G♭ | A♭ | -1  C + 1/ - ½ G + ½ | ? |
| B♭ | ↔ D | | | F# | ↔ A | -1  C + 1/ - ½ G + 1 | B♭+7 |
| B♭ | D | | | G♭ | A | -1  C + 1/ - ½ G + 1 | ? |
| B♭ | ↔ D | | F | ↔ A♭ | | -1  C + 1/ - 1 G + ½ | B♭7,Gm7-9 |
| B♭ | D | | F | | G# | -1  C + 1/ - 1 G + ½ | C11#5   enhar |
| B♭ | ↔ D | | F | ↔ | A | -1  C + 1/ - 1 G + 1 | B♭maj7,Gm9,C13 |

Split Root and 3$^{rd}$

| | C | | E | | G | | |
|---|---|---|---|---|---|---|---|
| B | ↔ D | ↔ | F | | G | - ½  C + 1  -1 E + ½ | G7,Em7-9 |
| B | ↔ D | ↔ | E# | | G | - ½  C + 1  -1 E + ½ | A11#5    enhar |
| B♭ | ↔ D | ↔ | F | | G | -1  C + 1  -1 E + ½ | B♭6,Gm7,E♭maj9,C11 |
| B♭ | ↔ D | ↔ | | F# | G | -1  C + 1  -1 E + 1 | Gm7+,Em9-5,A13♭9 |
| B | ↔ D | ↔ | | F# | G | - ½  C + 1  -1 E + 1 | Gmaj7,Em9, A13 |

Fig. 5C

Split 3$^{rd}$ and 5$^{th}$

| C | | E | | G | | | | |
|---|---|---|---|---|---|---|---|---|
| C | | E♭ ↔ | F | ↔ | A♭ | - ½ E + ½ -1 G + ½ | A♭6,Fm7,D♭maj9,B♭11 | |
| C | | E♭ ↔ | | G♭ ↔ | A♭ | -½ E + 1 - ½ G + ½ | A♭7,Fm7-9 | |
| C | | E♭ ↔ | | F# ↔ | A♭ | -½ E + 1 - ½ G + ½ | B♭11#5 | enhar |
| C | | E♭ ↔ | | F# ↔ | A♭ | -½ E + 1 - ½ G + ½ | B♭11#5 | enhar |
| C | | E♭ ↔ | F | ↔ | A | - ½ E + ½ -1 G + 1 | F7,Dm7-9 | |
| C | | D# ↔ | F | ↔ | A | - ½ E + ½ -1 G + 1 | G11#5 | enhar |
| C | | E♭ ↔ | | G♭ ↔ | A | -½ E + 1 - ½ G + 1 | Adim7 | |
| C | D | ↔ | F# ↔ | | A | -1 E + 1 - ½ G + 1 | D7,Bm7-9 | |
| B# | D | ↔ | F# ↔ | | A | -1 E + 1 - ½ G + 1 | E11#5 | enhar |
| C | D | ↔ | F | ↔ | A♭ | - 1 E + ½ -1 G + ½ | Fm6,Dm7-5,B♭9,G11♭9 | |
| C | E♭♭ | ↔ | | G♭ ↔ | A♭ | -1 E + 1 - ½ G + ½ | A♭7-5, | |
| C | D | ↔ | F# ↔ | | A♭ | -1 E + 1 - ½ G + ½ | B♭9+5 | enharmonic |
| C | D | ↔ | F | ↔ | A | - 1 E + ½ -1 G + 1 | F6,Dm7,B♭maj9,G11 | |

Fig. 6

The A Minor Family of Chords

Simple Chords (3-note) Generated from the A Minor Triad

```
     G#    A#       C#    D#       F#    G#
  G   A  B  C    D    E  F  G    A
     Ab    Bb       Db    Eb       Gb    Ab
```

|       |       |       |       | R | 3rd | 5th |               |
|       |       |       |       | A | C   | E   |               |

| | | | | | | |
|---|---|---|---|---|---|---|
| A | C | E | | | | Am |
| A | C | E | | | | Fmaj7  N/R |
| A | C | E | | | | C6      N/5 |
| A | C | E | | | | F#m7-5 |
| A | C | E | | | | D9 or Dm9  N/3 |
| A | C | E | | | | B11b9 |
| Ab ← | C | E | | | -½ | Ab+5 |
| G# ← | C | E | | | -½ | E+5, C+5 |
| → Bb | C | E | | | +½ | C7  N/5 |
| A# | C | E | | | +½ | |
| G ← | C | E | | | -1 | C |
| G ← | C | E | | | -1 | Am7  N/R |
| G ← | C | E | | | -1 | Fmaj9  N/3 |
| G ← | C | E | | | -1 | D11  N/5 |
| B | C | E | | | +1 | ? |
| A | C | Eb ← | | | -½ | Cm6  N/5, F7  N/R |
| A | C | Eb ← | | | -½ | Adim, F#dim7 |
| A | C | → F | | | +½ | F |
| A | C | → F | | | +½ | Dm7 |
| A | C | D | | | -1 | ? |
| A | C | → | F# | | +1 | Am6 |
| A  B ← | | E | | | -½ | B7sus4  N/5 |
| A  → C# | | E | | | +½ | A, F#m7, B11 |
| A  Bb | | E | | | -1 | |
| A  → D | | E | | | +1 | Asus |

Fig. 7A

The A Minor Family of Chords
Full Chord Generated from Splitting the Root OR 3rd OR 5th of the A Minor Triad

| | G# | A# | | C# | D# | | F# | | |
|---|---|---|---|---|---|---|---|---|---|
| G | A | B C | D | E | F | G | | Tone | |
| | Ab | Bb | Db | Eb | | Gb | | Dn/Up | |

Split the Root (A)

| | | | | | | | |
|---|---|---|---|---|---|---|---|
| | A | C | E | | | | Am, Fmaj7 |
| | G# | Bb C | E | | -½ A | +½ | ? |
| | Ab | Bb C | E | | -½ A | +½ | ? |
| | Ab | B C | E | | -½ A | +1 | ? |
| | G# | B C | E | | -½ A | +1 | ? |
| G ↔ | | Bb C | E | | -1 A | +½ | Am7-9, C7 |
| G | | A# C | E | | -1 A | +½ | ? |
| G ↔ | | B C | E | | -1 A | +1 | D13, Am9, Cmaj7 |

Split the 3rd (C)

| | | | | | | |
|---|---|---|---|---|---|---|
| A | C | | E | | | |
| A | B ↔ C# | | E | -½ C | +½ | Aadd9 |
| A | B | Db | E | -½ C | +½ | ? |
| A | B | D | E | -½ C | +1 | |
| A | Bb | Db | E | -1 C | +½ | |
| A | Bb | C# | E | -1 C | +½ | ? |
| A | Bb | D | E | -1 C | +1 | |

Split the 5th (E)

| | | | | | | |
|---|---|---|---|---|---|---|
| A | C | E | | | | |
| A | C | Eb ↔ F | | -½ E | +½ | Dm7-9, F7 |
| A | C | D# F | | -½ E | +½ | ? |
| A | C | Eb ↔ Gb | | -½ E | +1 | Adim7, F7-9 |
| A | C | D# ↔ F# | | -½ E | +1 | B7-9, D#dim7(Ebdim7) |
| Bbb | C | Eb ↔ Gb | | -½ E | +1 | Cdim7, Ab7-9 |
| A | C | Eb ↔ F# | | -½ E | +1 | D7-9, F#dim7 |
| Bbb | Dbb | Eb ↔ Gb | | -½ E | +1 | Ebdim7, Cb7-9(B7-9) |
| A | C | Eb ↔ Gb | | -½ E | +1 | F7-9, Adim7 |

Fig. 7B

| | | | | | | | |
|---|---|---|---|---|---|---|---|
| B♭♭ | D♭♭ | E♭ | ↔ | G♭ | -½ E + 1 | | G♭dim7,D7-9 |
| B♭♭ | C | E♭ | ↔ | G♭ | -½ E + 1 | | A♭7-9,Cdim7 |
| A | C | D | ↔ | F | -1 E +½ | | G11,B♭maj9,Dm7,F6 |
| A | C | D | ↔ | F# | -1 E +1 | | Bm7-9,D7 |
| A | C | D | | G♭ | -1 E +1 | | ? |

Fig. 8A

The A Minor Family of Chords

Full Chord Generated from Splitting the Root AND 5$^{th}$, Root AND 3$^{rd}$, 3$^{rd}$ AND 5$^{th}$ of the A Minor Triad

```
    G#    A#        C#      D#          F#
G     A   B   C   D     E  F   G       Tone
  Ab   Bb        Db      Eb      Gb    Dn/Up
```

Split Root and 5$^{th}$

| | | | | | |
|---|---|---|---|---|---|
| A | C | E | | | Am, Fmaj7 |
| Ab ↔ Bb | | Eb ↔ F | | - ½ A + ½ - ½ E + ½ | Bb7sus4, Db6/9 |
| Ab ↔ Bb | | Eb ↔ F# | | - ½ A + ½ - ½ E + 1 | ? |
| Ab ↔ Bb | D | ↔ F | | - ½ A + ½ - 1 E + ½ | Gm7-9, Bb7 |
| Ab ↔ Cb | | Eb ↔ F | | - ½ A + 1 - ½ E + ½ | Abm6, Fm7-5, Db9, Bb11b9 |
| Ab ↔ Cb | | Eb ↔ Gb | | - ½ A + 1 - ½ E + 1 | Abm7,  ,Db11 |
| G# ↔ B | | D# ↔ F# | | - ½ A + 1 - ½ E + 1 | B6, G#m7, Emaj9, C#11 |
| Ab ↔ Cb | D | ↔ F | | - ½ A + 1 - 1 E + ½ | Ddim7 |
| Ab ↔ Cb | Ebb | ↔ F | | - ½ A + 1 - 1 E + ½ | Db7-9 |
| Ab ↔ Cb | Ebb | ↔ Gb | | - ½ A + 1 - 1 E + 1 | Abm7-5,  ,Db11b9 |
| G# ↔ B | D | ↔ F# | | - ½ A + 1 - 1 E + 1 | Bm6, G#m7-5, E9, C#11b9 |
| G ↔ Bb | | Eb ↔ F | | - 1 A + ½ - ½ E + ½ | Ebadd9 |
| G ↔ B | | D# ↔ F | | - 1 A + 1 - ½ E + ½ | G7+5, C#9-5 |
| Abb ↔ Cb | | Eb ↔ F | | - 1 A + 1 - ½ E + ½ |  ,Db9-5 |
| G ↔ B | D | ↔ F | | - 1 A + 1 - 1 E + ½ | Em7-9, G7 |
| G ↔ B | D | ↔ F# | | - 1 A + 1 - 1 E + 1 | Gmaj7, Em9, A13 |

Fig. 8B

|   |   | A |   | C |   | E |   | Split Root and 3rd |
|---|---|---|---|---|---|---|---|---|
|   | G# ↔ |   | B | ↔ | C# |   | E | -½ A + ! -½ C + ½  E6,C#m7,Amaj9,F#11 |
|   | G# ↔ |   | A# | ↔ | C# |   | E | -½ A + ½ -1 C + ½  Dbm6,Bbm7-5,Gb9,Eb11b9 |
|   | G# ↔ |   | A# | ↔ | C# |   | E | -½ A + ½ -1 C + ½  C#m6,A#m7-5,F#9,D#11b9 |
|   | G# ↔ |   | Bb | ↔ |   | D | E | -½ A + ½ -1 C + 1  C9+5,E7-5 |
|   | G# ↔ |   | B | ↔ |   | D | E | -½ A + 1 -½ C + 1  C#m7-9,E7 |
| G | ↔ |   | B | ↔ |   | D | E | -1 A + 1 -½ C + 1  G6,Em7,Cmaj9,A11 |
| G | ↔ |   | B | ↔ | C# |   | E | -1 A + 1 -½ C + ½  Em6,C#m7-5,A9,F#11b9 |
| G |   | ↔ | Bb | ↔ | Db |   | E | -1 A + ½ -1 C + ½  Edim7 |
| G |   | ↔ | Bb | ↔ | Db |   | Fb | -1 A + ½ -1 C + ½  Eb7-9 |

|   |   | A |   | C |   | E |   | Split 3rd and 5th |
|---|---|---|---|---|---|---|---|---|
| A |   | B | ↔ |   | D | ↔ | F |    -½ C + 1 -1 E + ½  Dm6,Bm7-5,G9,E11b9 |
| A |   | B | ↔ |   | D | ↔ |   | F# -½ C + 1 -1 E + 1  D6,Bm7,Gmaj9,E11 |
| A | Bb |   | ↔ |   | D | ↔ | F |    -1 C + 1 -1 E + ½  Bbmaj7,Gm9,C13 |
| A | Bb |   | ↔ |   | D | ↔ |   | F# -1 C + 1 -1 E + 1  Bbmaj7+5 |

Advanced Chord Shapes

● Black Key     b = Black Key
○ White Key     w = White Key

These are the shapes for all the 4-note chords on the keyboard

Fig. 9B

| Pattern | Shapes | Group |
|---|---|---|
| bbbw | ⌐⌐ ⌐⌵ ⌵ ⌐ | Group 3 Chords |
| bbwb | ⌐⌵ ⌵⌐ ⌐⌐ ⌐⌐ | Group 3 Chords |
| bwbb | ⌵⌐ ⌐⌐ ⌐⌐ ⌐⌵ | Group 3 Chords |
| wbbb | ⌐⌐ ⌐⌐ ⌐⌵ ⌵⌐ | Group 3 Chords |
| bwbw | ⌵⌵ ⌵⌵ | Group 4 Chords |
| wbwb | ⌵⌵ ⌵⌵ | Group 4 Chords |
| wwww | See note 1 | Group 5 Chords |
| bbbb | See note 2 | Group 6 Chords |

Summary

There are only sixteen different shapes for all the 4-note chords on the keyboard.

| Pattern | Shapes | Group |
|---|---|---|
| Bwww | ⌐ ⌐ ⌵ ⌵ | Group 1 Chords |
| bbww | ⌐ ⌵ ⌐ ⌐ | Group 2 Chords |
| bbbw | ⌐ ⌵ ⌵ ⌐ | Group 3 Chords |

Fig. 9C

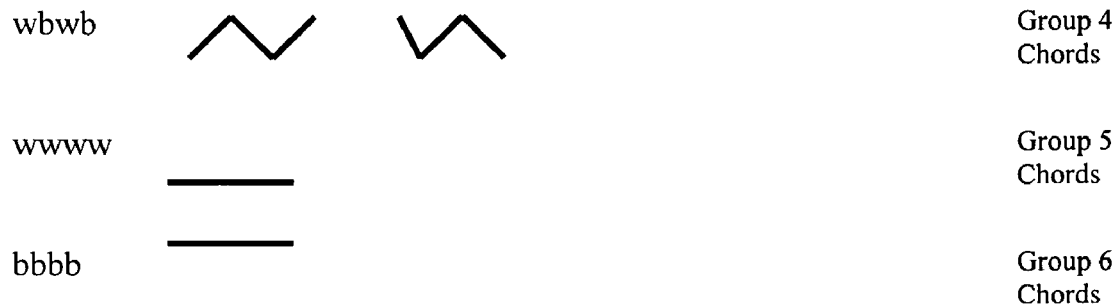

wbwb — Group 4 Chords wwww — Group 5 Chords bbbb — Group 6 Chords

Note 1. The chords with four white notes do not form a pattern but are quite easy to memorize since they use only white notes.

Chords with four white keys can be represented in the following five forms:

Form 1    O    O    O    O

Form 2    O    O    O O

Form 3    O    O O    O

Form 4    O O    O    O

Form 5    O O    O O

Note 2. These are the only chords I could find with four black notes:

Ebm7, Eb7sus4, F#6, F#6/9, Ab7sus4. Ab11, Bmaj9, B6/9

Fig. 10A

Group 1 Chords

| bwww | \_ | _/ | _/\_ | _/\_ |
|---|---|---|---|---|
| C | C13 | C7 | C9 | Cm6 |
|  |  | C7sus4 | Cmaj7-5 | C11 |
|  |  | C7/6 | Cmaj7+5 | Cm7+ |
| D♭ | D♭m7-5 | D♭9-5 |  | D♭7-9 |
|  | D♭7+5 | D♭9+5 |  | D♭m7-9 |
|  | D♭7-5 | D♭m9+5 |  |  |
|  | D♭maj7-5 | D♭m9-5 |  |  |
|  | D♭maj7+5 |  |  |  |
| D | D9 |  | Dm7-5 | D6 |
|  | D7/6 | Dm7+ | Ddim7 | D7 |
|  | D6/9 | Dm7-9 | D11♭9 | Dm9+5 |
|  | D11#5 |  | Dadd9 | Dm9-5 |
|  |  |  |  | D13♭9 |
| E♭ | E♭maj7-5 |  | E♭9-5 | E♭maj9 |
|  | E♭maj7+5 |  | E♭9+5 | E♭6/9 |
| E | E7-9 | Em6 |  |  |
|  |  | Em9 | Em7-5 | E7 |
|  |  | Em9+5 | E11 | E7+5 |
|  |  | E13♭9 | E11#5 |  |
|  |  | Em7+ |  |  |
| F |  | F7 | F9-5 | Fm6 |
|  |  | F7-5 | F9 | Fdim7 |
|  |  | F7/6 | Fmaj7+5 | Fm7+ |
| F# | F#m7-5 | F#m9+5 | F#11#5 |  |
|  | F#11♭9 | F#m9-5 |  | F#m7-9 |
|  |  | F#13♭9 |  |  |
| G | G11#5 | Gmaj7 | G7+5 | Gm6 |
|  |  | Gm9 | G7-5 | Gm7 |
|  |  | G7-9 | Gmaj9 | G9-5 |
|  |  |  | G11♭9 | G9+5 |
|  |  |  |  | G13♭9 |
| A♭ | A♭dim7 |  |  |  |
|  | A♭maj7-5 |  |  |  |
|  | A♭maj7+5 |  |  |  |
| A |  | Am6 | Am7-5 | A7 |
|  | A9 | A13 | A11♭9 | A7+5 |
|  | A9+5 | Am7+ | Aadd9 | Am9-5 |
|  |  | Am7-9 |  |  |

Fig. 10B

| | | | | |
|---|---|---|---|---|
| B♭ | B♭maj7 | B♭7/6 | B♭9-5 | |
| | B♭maj7-5 | | B♭9 | |
| | B♭6 | | B♭7-9 | |
| | B♭add9 | | | |
| B | B11♭9 | Bdim7 | Bm7 | B7+5 |
| | | Bm9+5 | B7sus4 | B7-5 |
| | | Bm9-5 | B11#5 | Bm7-9 |
| | | B13♭9 | | |

Fig. 11A

Group 1 Chord Summary bwww   \\___   ___/   _/\\_   _/\\___

| Chord | # in | | Notes | | | | Comments |
|---|---|---|---|---|---|---|---|
| Dim7 | 4 | Bdim7 | B | D | F | A♭ | |
| 7-9 | 4 | B♭7-9 | C♭ | D | F | A♭ | enharmonic |
| 6th | 2 | B♭6 | G | B♭ | D | F | |
| m7 | 2 | Gm7 | G | B♭ | D | F | |
| Maj9 | 2 | E♭maj9 | G | B♭ | D | F | |
| 11th | 2 | C11 | G | B♭ | D | F | |
| Maj7 | 2 | Gmaj7 | G | B | D | F# | |
| m9th | 2 | Em9 | G | B | D | F# | |
| 13th | 2 | A13 | G | B | D | F# | |
| m6 | 5 | Cm6 | E♭ | G | A | C | |
| m7-5 | 5 | Am7-5 | E♭ | G | A | C | |
| 9th | 5 | F9 | E♭ | G | A | C | |
| 11♭9 | 5 | D11♭9 | E♭ | G | A | C | |
| m7+ | 5 | Cm7+ | C | E♭ | G | B | |
| m9-5 | 5 | Am9-5 | C | E♭ | G | B | |
| 13♭9 | 5 | D13♭9 | C | E♭ | G | B | |
| Maj7-5 | 5 | B♭maj7-5 | B♭ | D | F♭ | A | |
| Maj7+5 | 5 | E♭maj7+5 | E♭ | G | B | D | |
| 7+5 | 5 | E7+5 | E | G# | B# | D | |
| 9-5 | 5 | B♭9-5 | F♭ | A♭ | C | D | enharmonic |
| 7-5 | 4 | F7-5 | F | A | C♭ | E♭ | |
| 9+5 | 4 | G9+5 | F | A | B | D# | enharmonic |
| 7sus4 | 2 | C7sus4 | C | F | G | B♭ | |
| 6/9 | 2 | E♭6/9 | C | F | G | B♭ | |

Fig. 11B

| | | | | | | | |
|---|---|---|---|---|---|---|---|
| 7th | 5 | F7 | F | A | C | E♭ | |
| m7-9 | 5 | Dm7-9 | F | A | C | E♭ | |
| 11#5 | 5 | G11#5 | F | A | C | D# | enharmonic |
| m9+5 | 5 | Em9+5 | G | B# | D | F# | |
| 7/6 | 4 | D7/6 | F# | A | B | C | |
| Add9 | 3 | Dadd9 | D | E | F# | A | |

Fig. 12A
Group 1 Chords
| bwww |  |  |  |  |
|---|---|---|---|---|
| Maj7 | B♭maj7 | Gmaj7 | | |
| 7th | | C7 | D7 | |
| | | F7 | A7 | |
| | | | E7 | |
| m7th | | | Gm7 | Bm7 |
| dim7 | A♭dim7 | Bdim7 | Fdim7 | Ddim7 |
| 6th | B♭6 | | D6 | |
| m6th | | Em6 | Cm6 | |
| | | Am6 | Fm6 | |
| | | | Gm6 | |
| 9th | D9 | | | C9 |
| | A9 | | | F9 |
| | | | | B♭9 |
| Maj9 | | | E♭maj9 | Gmaj9 |
| m9th | | Em9 | | |
| | | Gm9 | | |
| 7sus4 | | C7sus4 | | B7sus4 |
| 11th | | | C11 | E11 |
| 13th | C13 | A13 | | |
| 13♭9 | | E13♭9 | D13♭9 | |
| | | F#13♭9 | G13♭9 | |
| | | B13♭9 | | |
| Maj7-5 | D♭maj7-5 | | | Cmaj7-5 |
| | E♭maj7-5 | | | |
| | A♭maj7-5 | | | |
| | B♭maj7-5 | | | |
| Maj7+5 | D♭maj7+5 | | | Cmaj7+5 |
| | E♭maj7+5 | | | Fmaj7+5 |
| | A♭maj7+5 | | | |
| 7-5 | D♭7-5 | F7-5 | B7-5 | G7-5 |
| 7+5 | D♭7+5 | | E7+5 | G7+5 |
| | | | A7+5 | |
| | | | B7+5 | |
| m7-5 | D♭m7-5 | | | Dm7-5 |
| | F#m7-5 | | | Em7-5 |
| | | | | Am7-5 |

Fig. 12B

| | | | | |
|---|---|---|---|---|
| m7+ | | Dm7+<br>Em7+<br>Am7+ | Cm7+<br>Fm7+ | |
| 7-9 | E7-9 | G7-9 | D♭7-9 | B♭7-9 |
| m7-9 | | Dm7-9<br>Am7-9 | D♭m7-9<br>F#m7-9<br>Bm7-9 | |
| add9 | B♭add9 | | | Dadd9<br>Aadd9 |
| 9-5 | | D♭9-5 | G9-5 | E♭9-5<br>F9-5<br>B♭9-5 |
| 9+5 | A9+5 | D♭9+5 | G9+5 | E♭9+5 |
| 11#5 | D11#5<br>G11#5 | | | E11#5<br>F#11#5<br>B11#5 |
| 11♭9 | F#11♭9<br>B11♭9 | | | D11♭9<br>G11♭9<br>A11♭9 |
| m9+5 | | D♭m9+5<br>Em9+5<br>F#m9+5<br>Bm9+5 | Dm9+5 | |
| m9-5 | | D♭m9-5<br>F#m9-5<br>Bm9-5 | Dm9-5<br>Am9-5 | |
| 6/9 | D6/9 | | E♭6/9 | |
| 7/6 | D7/6 | C7/6<br>F7/6<br>B♭7/6 | | |

Fig. 13

Group 2 Chords

| bbww | ⌐\_ | \\\_/ | \_/⌐ | /⌐\ |
|---|---|---|---|---|
| C | C13♭9<br>C11#5 | | C7+5<br>C7-5<br>C7-9 | Cdim7<br>C9-5<br>C9+5<br>C11♭9 |
| D♭ | | D♭dim7<br>D♭11♭9 | D♭13♭9<br>D♭11#5 | D♭7/6 |
| D | D9-5<br>D9+5 | D7-9 | | D7+5<br>D7-5 |
| E♭ | E♭dim7 | E♭7+5<br>E♭7-5<br>E♭add9 | | E♭9<br>E♭7-9 |
| E | | E9<br>E9+5 | Edim7 | E7-5<br>Eadd9 |
| F | | | F7+5<br>F7-9 | F9+5 |
| F# | F#7+5<br>F#7-5<br>F#7-9<br>F#maj7-5<br>F#maj7+5 | F#dim7<br>F#9-5<br>F#9+5 | | |
| G | Gm9+5<br>Gm9-5 | Gm7-9 | Gmaj7-5<br>Gmaj7+5 | Gm7-5<br>Gdim7 |
| A♭ | | A♭m7-5<br>A♭7+5<br>A♭7-5 | A♭9-5<br>A♭9+5<br>A♭m9+5<br>A♭m9-5 | A♭7-9<br>A♭m7-9 |
| A | A9-5 | A7-9 | Adim7 | A7-5 |
| B♭ | B♭m6<br>B♭dim7<br>B♭m7+ | B♭7<br>B♭7-5 | | B♭9+5 |
| B | B7-9 | B9-5<br>B9+5 | Bm6<br>Bm7+ | B7 |

Fig. 14A

Group 2 Chord Summary bbww

| Chord | # in | | Notes | | | | Comments |
|---|---|---|---|---|---|---|---|
| Dim7 | 8 | Cdim7 | C | E♭ | G♭ | B♭♭ | |
| 7-9 | 8 | D7-9 | C | E♭ | F# | A | enharmonic |
| m7 | 0 | | | | | | |
| 6th | 0 | | | | | | |
| Maj9 | 0 | | | | | | |
| 11th | 0 | | | | | | |
| Maj7 | 0 | | | | | | |
| m9th | 0 | | | | | | |
| 13th | 0 | | | | | | |
| Maj7-5 | 2 | Gmaj7-5 | G | B | D♭ | F# | |
| Maj7+5 | 2 | Gmaj7+5 | G | B | D# | F# | |
| m6th | 2 | Bm6 (C♭m6) | G# | B | D | F# | |
| m7-5 | 2 | A♭m7-5 | A♭ | C♭ | E♭♭ | G♭ | enharmonic |
| 9th | 2 | E9 (F♭9) | G# | B | D | F# | |
| 11♭9 | 2 | D♭11♭9 | A♭ | C♭ | E♭♭ | G♭ | |
| m7+ | 2 | B♭m7+ | B♭ | D♭ | F | A | |
| m9-5 | 2 | Gm9-5 | B♭ | D♭ | F | A | |
| 13♭9 | 2 | D♭13♭9 | C♭ | E♭♭ | G♭ | B♭ | |
| 7+5 | 6 | D7+5 | D | F# | A# | C | |
| 9-5 | 6 | A♭9-5 | E♭♭ | G♭ | B♭ | C | enharmonic |
| 7-5 | 8 | F#7-5 | F# | A# | C | E | |
| 9+5 | 8 | D9+5 | F# | A# | C | E | |
| 7sus4 | 0 | | | | | | |
| 6/9 | 0 | | | | | | |

Fig. 14B

| | | | | | | |
|---|---|---|---|---|---|---|
| 7th | 2 | B♭7 | B♭ | D | F | A♭ |
| m7-9 | 2 | Gm7-9 | B♭ | D | F | A♭ |
| 11#5 | 2 | C11#5 | B♭ | D | F | G# |
| m9+5 | 2 | Gm9+5 | B♭ | D# | F | A |
| 7/6 | 1 | D♭7/6 | F | A♭ | B♭ | C♭ |
| Add9 | 2 | Eadd9 | E | F# | G# | B |

Fig. 15

Group 2 Chords

| bbww | ⌐_ | \_/ | _/⁻ | /⁻\ |
|---|---|---|---|---|
| Maj7 | 0 | | | |
| 7th | | B♭7 | | B7 |
| m7th | 0 | | | |
| dim7 | B♭dim7 | D♭dim7 | Edim7 | Cdim7 |
| | E♭dim7 | F#dim7 | Adim7 | Gdim7 |
| 6th | 0 | | | |
| m6th | B♭m6 | | Bm6 | |
| 9th | | E9 | | E♭9 |
| Maj9 | 0 | | | |
| m9th | 0 | | | |
| 7sus4 | 0 | | | |
| 11th | 0 | | | |
| 13th | 0 | | | |
| 13♭9 | C13♭9 | | D♭13♭9 | |
| Maj7-5 | F#maj7-5 | | Gmaj7-5 | |
| Maj7+5 | F#maj7+5 | | Gmaj7+5 | |
| 7-5 | F#7-5 | E♭7-5 | C7-5 | D7-5 |
| | | B♭7-5 | | A7-5 |
| | | A♭7-5 | | E7-5 |
| 7+5 | F#7+5 | E♭7+5 | C7+5 | D7+5 |
| | | A♭7+5 | F7+5 | |
| m7-5 | | A♭m7-5 | | Gm7-5 |
| m7+ | B♭m7+ | | Bm7+ | |
| 7-9 | F#7-9 | A7-9 | C7-9 | E♭7-9 |
| | B7-9 | | D7-9 | A♭7-9 |
| | | | F7-9 | |
| m7-9 | | Gm7-9 | | A♭m7-9 |
| add9 | | E♭add9 | | Eadd9 |
| 9-5 | D9-5 | F#9-5 | A♭9-5 | C9-5 |
| | A9-5 | B9-5 | | |
| 9+5 | D9+5 | E9+5 | A♭9+5 | C9+5 |
| | | F#9+5 | | F9+5 |
| | | B9+5 | | B♭9+5 |
| 11#5 | C11#5 | | D♭11#5 | |
| 11♭9 | | D♭11♭9 | | C11♭9 |
| m9+5 | Gm9+5 | | A♭m9+5 | |
| m9-5 | Gm9-5 | | A♭m9-5 | |
| 6/9 | 0 | | | |
| 7/6 | | | | D♭7/6 |

Fig. 16

Group 3 Chords

| bbbw | ╲ | ╲╱ | ╲╱ | ╱‾ |
|---|---|---|---|---|---|
| C | Cm9+5<br>Cm9-5 | | Cm7-9 | Cm7-5 |
| D♭ | | | D♭6<br>D♭m6<br>D♭11 | D♭13<br>D♭6/9<br>D♭add9 |
| | D♭7sus4 | | | |
| D | | | | Dmaj7-5<br>Dmaj7+5 |
| E♭ | E♭m6<br>E♭m9<br>E♭m7+<br>E♭m7-9 | E♭m7-5<br>E♭11♭9<br>E♭11 | E♭7 | |
| E | | E9-5 | Emaj9<br>E6/9 | Emaj7-5 |
| F | Fm9+5<br>F13♭9 | F11#5 | Fm7-9 | F11♭9 |
| F# | F#maj7<br>F#7<br>F#7/6 | F#maj9<br>F#9 | F#m6 | |
| A♭ | A♭13 | A♭11♭9<br>A♭add9 | A♭7<br>A♭m7 | A♭9<br>A♭m9<br>A♭11#5<br>Amaj7-5 |
| A | | | | |
| B♭ | B♭m9+5 | B♭m7-5<br>B♭m7<br>B♭7sus4<br>B♭11#5 | B♭7+5 | |
| B | B7/6 | B9 | | Bmaj7<br>B6<br>Badd9 |

Fig. 17A

Group 3 Chord Summary bbbw

| Chord | # in | Notes | | | | Comments |
|---|---|---|---|---|---|---|
| dim7 | 0 | | | | | |
| 7-9 | 0 | | | | | |
| 6th | 2 | D♭6 | B♭ | D♭ | F | A♭ |
| m7 | 2 | B♭m7 | B♭ | D♭ | F | A♭ |
| Maj9 | 2 | G♭maj9 | B♭ | D♭ | F | A♭ |
| 11th | 2 | E♭11 | B♭ | D♭ | F | A♭ |
| Maj7 | 2 | Bmaj7 | B | D# | F# | A# |
| m9th | 2 | G#m9 | B | D# | F# | A# |
| 13th | 2 | C#13 | B | D# | F# | A# |
| m6th | 3 | E♭m6 | C | E♭ | G♭ | B♭ |
| m7-5 | 3 | Cm7-5 | C | E♭ | G♭ | B♭ |
| 9th | 3 | A♭9 | C | E♭ | G♭ | B♭ |
| 11♭9 | 3 | F11♭9 | C | E♭ | G♭ | B♭ |
| m7+ | 1 | E♭m7+ | D | E♭ | G♭ | B♭ |
| m9-5 | 1 | Cm9-5 | D | E♭ | G♭ | B♭ |
| 13♭9 | 1 | F13♭9 | D | E♭ | G♭ | B♭ |
| Maj7-5 | 3 | Emaj7-5 | E | G# | B♭ | D# |
| Maj7+5 | 1 | Dmaj7+5 | D | F# | A# | C# |
| 7+5 | 1 | B♭7+5 | D | F# | A♭ | B♭ |
| 9-5 | 1 | E9-5 | D | F# | G# | B♭ | enharmonic |
| 7-5 | 0 | | | | | |
| 9+5 | 0 | | | | | |
| 7sus4 | 2 | B♭7sus4 | B♭ | E♭ | F | A♭ |
| 6/9 | 2 | D♭6/9 | B♭ | E♭ | F | A♭ |
| 7th | 3 | E♭7 | E♭ | G | B♭ | D♭ |
| m7-9 | 3 | Cm7-9 | E♭ | G | B♭ | D♭ |
| 11#5 | 3 | F11#5 | E♭ | G | B♭ | C# |

Fig. 17B

| | | | | | | |
|---|---|---|---|---|---|---|
| m9+5 | 3 | Cm9+5 | E♭ | G# | B♭ | D |
| 7/6 | 2 | B7/6 | D# | F# | G# | A |
| Add9 | 3 | Badd9 | B | C# | D# | F# |

Fig. 18A

Group 3 Chords

| bbbw | ＼ | ∨ | ∨ | ╱ |
|---|---|---|---|---|
| Maj7 | F#maj7 | | | Bmaj7 |
| 7th | F#7 | | Eb7 | |
|  |  |  | Ab7 | |
| m7th | | Bbm7 | Abm7 | |
| dim7 | | | | |
| 6th | | | Db6 | B6 |
| m6th | Ebm6 | | Dbm6 | |
|  |  |  | F#m6 | |
| 9th | | F#9 | | Ab9 |
|  |  | B9 |  |  |
| Maj9 | | F#maj9 | Emaj9 | |
| m9th | Ebm9 | | | Abm9 |
| 7sus4 | Db7sus4 | Bb7sus4 | | |
| 11th | | Eb11 | Db11 | |
| 13th | Ab13 | | | Db13 |
| 13b9 | F13b9 | | | |
| Maj7-5 | | | | Dmaj7-5 |
|  |  |  |  | Emaj7-5 |
|  |  |  |  | Amaj7-5 |
| Maj7+5 | | | | Dmaj7+5 |
| 7-5 | | | | |
| 7+5 | | | Bb7+5 | |
| m7-5 | | Ebm7-5 | | Cm7-5 |
|  |  | Bbm7-5 |  |  |
| m7+ | Ebm7+ | | | |
| dim7 | 0 | | | |
| 7-9 | 0 | | | |
| m7-9 | Ebm7-9 | | Cm7-9 | |
|  |  |  | Fm7-9 |  |
| add9 | | Abadd9 | | Dbadd9 |
|  |  |  |  | Badd9 |
| 9-5 | | E9-5 | | |
| 9+5 | | | | |
| 11#5 | | F11#5 | | Ab11#5 |
|  |  | Bb11#5 |  |  |
| 11b9 | | Eb11b9 | | F11b9 |
|  |  | Ab11b9 |  |  |

Fig. 18B

| | | | |
|---|---|---|---|
| m9+5 | Cm9+5 | | |
| | Fm9+5 | | |
| | B♭m9+5 | | |
| m9-5 | Cm9-5 | | |
| 6/9 | | E6/9 | D♭6/9 |
| 7/6 | F#7/6 | | |
| | B7/6 | | |

Fig. 19A

Group 4 Chords

| bwbw | ⋁ | ⋀ |
|---|---|---|
| C | Cm9 | Cm7 |
| D♭ | D♭mai7<br>D♭7<br>D♭m7<br>D♭m7+ | D♭mai9<br>D♭9<br>D♭m9 |
| D | <br>Dmai9 | Dmai7 |
| E♭ | E♭mai7<br>E♭6<br>E♭m9+5<br>E♭m9-5<br>E♭13♭9<br>E♭13 | E♭7/6<br>E♭11#5 |
| E | E7/6 | Emai7<br>E6<br>Em9-5<br>E13<br>Emai7+5 |
| F | Fm9<br>Fm9-5<br>F13 | Fm7-5<br>Fm7<br>F7sus4<br>F11 |
| F# | F#m7<br>F#7sus4<br>F#11<br>F#m7+ | F#m9<br>F#13 |
| G | | Gm7+ |
| A♭ | A♭mai7<br>A♭6<br>A♭m6<br>A♭13♭9<br>A♭m7+ | A♭mai9<br>A♭7/6<br>A♭6/9 |

Fig. 19B

| | | |
|---|---|---|
| A | | Amaj7 |
| | Amaj9 | A6 |
| | A7/6 | A13♭9 |
| | A6/9 | Amaj7+5 |
| B♭ | B♭m7-9 | B♭11♭9 |
| | B♭m9 | B♭11 |
| | B♭m9-5 | |
| | B♭13♭9 | |
| | B♭13 | |
| | B♭maj7+5 | |
| B | B11 | Bm9 |
| | | B13 |
| | | Bmaj7-5 |
| | | Bmaj7+5 |

Group 4 Chord Summary bwbw

| Chord | # in | Notes | | | | | Comments |
|---|---|---|---|---|---|---|---|
| 6th | 4 | Eb6 | C | Eb | G | Bb | |
| m7 | 4 | Cm7 | C | Eb | G | Bb | |
| Maj9 | 4 | Abmaj9 | C | Eb | G | Bb | |
| 11th | 4 | F11 | C | Eb | G | Bb | |
| Maj7 | 6 | Dmaj7 | D | F# | A | C# | |
| m9th | 6 | Bm9 | D | F# | A | C# | |
| 13th | 6 | E13 | D | F# | A | C# | |
| Maj7-5 | 1 | Bmaj7-5 | B | D# | F | A# | |
| Maj7+5 | 4 | Bmaj7+5 | B | D# | F## | A# | |
| m6th | 1 | Abm6 | Cb | Eb | F | Ab | |
| m7-5 | 1 | Fm7-5 | Cb | Eb | F | Ab | |
| 9th | 1 | Db9 | Cb | Eb | F | Ab | |
| 11b9 | 1 | Bb11b9 | Cb | Eb | F | Ab | |
| m7+ | 4 | Abm7+ | Cb | Eb | G | Ab | |
| m9-5 | 4 | Fm9-5 | Cb | Eb | G | Ab | |
| 13b9 | 4 | Bb13b9 | Cb | Eb | G | Ab | |
| 7+5 | 0 | | | | | | |
| 9-5 | 0 | | | | | | |
| 7-5 | 0 | | | | | | |
| 9+5 | 0 | | | | | | |
| 7sus4 | 2 | F#7sus4 | F# | B | C# | E | |
| 6/9 | 2 | A6/9 | F# | B | C# | E | |

Fig. 20B

| | | | | | | |
|---|---|---|---|---|---|---|
| 7<sup>th</sup> | 1 | D♭7 | D♭ | F | A♭ | C♭ |
| m7-9 | 1 | B♭m7-9 | D♭ | F | A♭ | C♭ |
| 11#5 | 1 | E♭11#5 | D♭ | F | A♭ | B |
| m9+5 | 1 | E♭m9+5 | G♭ | B | D♭ | F |
| 7/6 | 4 | A7/6 | C# | E | F# | G |

Group 4 Chords bwbw

| | | |
|---|---|---|
| Maj7 | D♭maj7 | Dmaj7 |
| | E♭maj7 | Emaj7 |
| | A♭maj7 | Amaj7 |
| 7th | D♭7 | |
| m7th | D♭m7 | Cm7 |
| | F#m7 | Fm7 |
| dim7 | 0 | |
| 6th | E♭6 | E6 |
| | A♭6 | A6 |
| m6th | A♭m6 | |
| 9th | | D♭9 |
| Maj9 | Dmaj9 | D♭maj9 |
| | Amaj9 | A♭maj9 |
| m9th | Cm9 | D♭m9 |
| | Fm9 | F#m9 |
| | B♭m9 | Bm9 |
| 7sus4 | F#7sus4 | F7sus4 |
| 11th | F#11 | F11 |
| | B11 | B♭11 |
| 13th | E♭13 | E13 |
| | F13 | F#13 |
| | B♭13 | B13 |
| 13♭9 | E♭13♭9 | A13♭9 |
| | A♭13♭9 | |
| | B♭13♭9 | |
| Maj7-5 | | Bmaj7-5 |
| Maj7+5 | B♭maj7+5 | Emaj7+5 |
| | | Amaj7+5 |
| | | Bmaj7+5 |
| 7-5 | 0 | |
| 7+5 | 0 | |

Fig. 21B

| | | |
|---|---|---|
| m7-5 | | Fm7-5 |
| m7+ | D♭m7+ | Gm7+ |
| | F#m7+ | |
| | A♭m7+ | |
| 7-9 | 0 | |
| m7-9 | B♭m7-9 | |
| add9 | 0 | |
| 9-5 | 0 | |
| 9+5 | 0 | |
| 11#5 | | E♭11#5 |
| 11♭9 | | B♭11♭9 |
| m9+5 | E♭m9+5 | |
| m9-5 | E♭m9-5 | Em9-5 |
| | Fm9-5 | |
| | B♭m9-5 | |
| 6/9 | A6/9 | A♭6/9 |
| 7/6 | E7/6 | E♭7/6 |
| | A7/6 | A♭7/6 |

Fig. 22A

Group 5 Chords wwww ———

| | |
|---|---|
| C | Cmaj7 |
| | C6 |
| | Cmaj9 |
| | C6/9 |
| | Cadd9 |
| D | Dm6 |
| | Dm7 |
| | D7sus4 |
| | Dm9 |
| | D11 |
| | D13 |
| E | Em7 |
| | Em7-9 |
| | E7sus4 |
| | E11b9 |
| F | Fmaj7 |
| | Fmaj7-5 |
| | F6 |
| | Fmaj9 |
| | F6/9 |
| | Fadd9 |
| G | G6 |
| | G7 |
| | G7sus4 |
| | G9 |
| | G7/6 |
| | G11 |
| | G13 |
| | G6/9 |
| | Gadd9 |

Fig. 22B

| | |
|---|---|
| A | Am7 |
| | A7sus4 |
| | Am9 |
| | Am9+5 |
| | A11 |
| | A11#5 |
| B♭ | B♭maj9 |
| | B♭6/9 |
| | Bm7-5 |

Fig. 23

Group 5 Chord Summary wwww —

| Chord | # in | | Notes | | | | Comments |
|---|---|---|---|---|---|---|---|
| 6th | 3 | C6 | A | C | E | G | |
| m7 | 3 | Am7 | A | C | E | G | |
| Maj9 | 3 | Fmaj9 | A | C | E | G | |
| 11th | 3 | D11 | A | C | E | G | |
| | | | | | | | |
| Maj7 | 2 | Cmaj7 | B | C | E | G | |
| m9th | 2 | Am9 | B | C | E | G | |
| 13th | 2 | D13 | B | C | E | G | |
| | | | | | | | |
| Maj7-5 | 1 | Fmaj7-5 | F | A | C♭ | E | |
| | | | | | | | |
| m6th | 1 | Dm6 | B | D | F | A | |
| m7-5 | 1 | Bm7-5 | B | D | F | A | |
| 9th | 1 | G9 | B | D | F | A | |
| 11♭9 | 1 | E11♭9 | B | D | F | A | |
| | | | | | | | |
| 7sus4 | 4 | A7sus4 | A | D | E | G | |
| 6/9 | 4 | C6/9 | A | D | E | G | |
| | | | | | | | |
| 7th | 1 | G7 | G | B | D | F | |
| m7-9 | 1 | Em7-9 | G | B | D | F | |
| 11#5 | 1 | A11#5 | G | B | D | E# | |
| | | | | | | | |
| 7/6 | 1 | G7/6 | B | D | E | F | |
| | | | | | | | |
| m9+5 | 1 | Am9+5 | C | E# | G | B | |
| | | | | | | | |
| Add9 | 3 | Cadd9 | C | D | E | G | |

Fig. 24A

Group 5 Chords wwww  ———

| | |
|---|---|
| Maj7 | Cmaj7 |
| | Fmaj7 |
| 7th | G7 |
| m7th | Dm7 |
| | Em7 |
| | Am7 |
| dim7 | 0 |
| 6th | C6 |
| | F6 |
| | G6 |
| m6th | Dm6 |
| 9th | G9 |
| Maj9 | Cmaj9 |
| | Fmaj9 |
| | B♭maj9 |
| m9th | Dm9 |
| | Am9 |
| 7sus4 | D7sus4 |
| | E7sus4 |
| | G7sus4 |
| | A7sus4 |
| 11th | D11 |
| | G11 |
| | A11 |
| 13th | D13 |
| | G13 |
| 13♭9 | 0 |
| Maj7-5 | Fmaj7-5 |
| Maj7+5 | 0 |
| 7-5 | 0 |
| 7+5 | 0 |
| m7-5 | Bm7-5 |
| m7+ | 0 |
| 7-9 | 0 |

Fig. 24B

| | |
|---|---|
| m7-9 | Em7-9 |
| add9 | Cadd9 |
| | Fadd9 |
| | Gadd9 |
| 9-5 | 0 |
| 9+5 | 0 |
| 11#5 | A11#5 |
| 11♭9 | E11♭9 |
| m9+5 | Am9+5 |
| m9-5 | 0 |
| 6/9 | C6/9 |
| | F6/9 |
| | G6/9 |
| | B♭6/9 |
| 7/6 | G7/6 |

Fig. 25

Group 6 Chords

--- b b b b

| | |
|---|---|
| E♭ | E♭m7 |
| | E♭7sus4 |
| F# | F#6 |
| | F#6/9 |
| | F#add9 |
| A♭ | A♭7sus4 |
| | A♭11 |
| B | Bmaj9 |
| | B6/9 |

Fig. 26

Group 6 Chord Summary bbbb

| Chord | # in | Notes | | | | | Comments |
|---|---|---|---|---|---|---|---|
| 6th | 1 | F#6 (Gb6) | D# | F# | A# | C# | enharmonic |
| m7 | 1 | Ebm7 | Eb | Gb | Bb | Db | |
| Maj9 | 1 | Bmaj9(Cbma | D# | F# | A# | C# | |
| 11th | 1 | Ab11 | Eb | Gb | Bb | Db | |
| 7sus4 | 2 | Ab7sus4 | Ab | Db | Eb | Gb | |
| 6/9 | 2 | B6/9 | G# | C# | D# | F# | enharmonic |
| add9 | 1 | F#add9 | F# | G# | A# | C# | |

Fig. 27

Group 6 Chords bbbb

| | |
|---|---|
| m7 | E♭m7 |
| 6th | F#6 |
| 7sus4 | E♭7sus4 |
| | A♭7sus4 |
| 11th | A♭11 |
| Maj9 | Bmaj9 |
| 6/9 | F#6/9 |
| | B6/9 |
| add9 | F#add9 |

VISUAL CHORD KEYBOARD INSTRUCTIONAL METHOD

CLAIM OF PROVISIONAL APPLICATION RIGHTS

This application claims the benefit of U.S. Provisional Patent Application No. 60/468,793, filed on May 9, 2003.

BACKGROUND OF THE INVENTION

1. Field of the Invention

The present invention relates to an instructional method for playing a keyboard musical instrument and in particular to a simplified method for learning chords based on common basic relative finger positions for three (triads) and four finger chords on the keyboard by learning a small number of basic visual shapes based on linear connections between adjacent fingers on the keyboard including eight basic shapes for the thirty six triads in each octave and sixteen basic shapes for four finger chords covering all possible chords on the keyboard, and chord changes within families of chords by a simple finger change to make a transition from one chord to another changing from one basic shape to another.

2. Description of the Prior Art

To become a competent musician, it is necessary to learn and remember all musical note relationships and chords, whose interactions together form the rudiments of musical theory. Such note relationships and chords are conventionally taught in an audible manner, with scant visual information to aid understanding. For those students who are naturally musically orientated, such learning may be relatively easy. However, for those students who are not so fortunate, it can prove to be extremely difficult to remember individual note relationships and a large number of chords and understand how they are interconnected. Furthermore, while all the note relationships and chords are being learned, it is necessary to learn how these are applied in the playing of a particular musical instrument.

With prior art systems, if you have to play a chord sequence, such as C, F and G, you learn the fingering for all three chords.

U.S. Pat. No. 3,335,630, issued Aug. 15, 1967 to Schmoyer, is for a teaching device for a keyboard instrument, which provides visual indication of the appropriate keys to be depressed in playing a chord in response to depression of a clavial key appropriate to the desired chord. Additional indications designate the note in the chord triad by which chord is identified and the particular finger to be used in playing that note.

U.S. Pat. No. 4,041,828, issued Aug. 16, 1977 to Leonard, indicates a chord fingering coordinator, which is a teaching and practicing aid for music students which graphically displays the relationship of the dominant, tonic, and subdominant scales in a particular key signature and as they relate to the diatonic scale in that key signature. The device structurally comprises a backing sheet that optionally has the scale tones of a diatonic scale named in a row along the bottom, and three preferably reversible panels disposed in staggered horizontal slits cut in the backing sheet. These panels have portions visible above the slit with indicia thereon indicating by fingering number or scale tone name musical notes representing chords or scales. The notes are spaced proportionally to the key spacing of a piano keyboard. There is an optional insert card having two selectively displayable portions, which represent the left and right hand, respectively, with the fingers thereof numbered in accordance with conventional elementary teaching techniques.

U.S. Pat. No. 4,480,521, issued Nov. 6, 1984 to Schmoyer, claims a system and method for instruction in the operation of a keyboard musical instrument, namely, an organ or piano. The system and method teaches the proper fingering for chord triads in the root, first, and second positions so as to play chord triads in the space of a single octave. The system may be operated manually by the student or, in some embodiments thereof, the system may be operated automatically by means of an external storage media device such as a video disc player.

U.S. Pat. No. 5,415,071, issued May 16, 1995 to Davies, shows a method of and means for producing musical note relationships providing an array of staggered lines or rows (1) of symbols, in which each symbol represents a musical note. Each line (1) comprises a repeated series of twelve symbols forming a musical series of semitones known as a chromatic scale, and each line is staggered with respect to adjacent lines such that groups of the symbols which represent the same musical note relationship, such as intervals, scales, chords, etc, form the same visual configuration, for example diagonal configurations (6 to 9) or vertical configuration (14 to 19), at respective locations in the array. In one embodiment, a device including means bearing such an array may be used as a learning aid comprising two overlapping members slidably movable relative to each other. Alternatively the contact positions of a keyboard of a keyboard musical instrument or a fingerboard of a stringed musical instrument may be arranged in accordance with the array.

U.S. Pat. No. 5,370,539, issued Dec. 6, 1994 to Dillard, provides a chord or scale indicating device includes at least one fixed member and at least one movable member. On one of the fixed or movable members a scale is provided of at least one octave including both the white and black notes of the octave. In this octave, the white notes A, G and D, are greater in transverse or radial extent than the white notes E, F, B, and C by a factor of about 1.5. The other of the fixed and movable members includes a series of indicating positions which indicate at least one scale or chord position for a given input key. Relative movement between the fixed and the movable member will enable the scale and or chord positions to be determined for each of the notes in the octave by such relative movement. Some of the embodiments disclosed in the specification are linear where the relative movement between the fixed and the movable member is either lateral or vertical and some of the embodiments disclosed are radial embodiments wherein rotational movement between the fixed and the movable member occurs. The embodiments disclosed include the major scale positions and both minor scale positions. The embodiments further include all of the chords for the given input key and related chords for the input key including the subdominant chord and dominant seventh related chord. For the given input key the major and minor tonic chords, the augmented chords, the sixth chords, the major and minor seventh chords, the diminished chords, the dominant and diminished ninth chords are included. The device is particularly useful in teaching students the relationship of the scales and chords illustrate. In a preferred embodiment the keyboard positions for both the treble clef and bass clef are included for all of the chords of all input keys.

U.S. Pat. No. 5,685,724, issued Nov. 11, 1997 to Bubar, provides a method of teaching music and provides the charts to do so. The method includes the steps of teaching the student that "every other finger plays every other key" and showing the student the hand placement on the keyboard that will correspond to a given set of indicia. The method provides a series of charts using indicia that progressively allows the student to play chords with either hand, a melody with the right hand while playing a chord with the left hand, or a multi-key melody with the right hand while playing a chord with the left hand. The method also instructs the student how the sheet music corresponds to the indicia in the charts so that the student can play sheet music.

U.S. Pat. No. 4,203,345, issued May 20, 1980 to Collin, describes an automatic visual music teaching device for displaying the structure of coded chords. The device comprises a plurality of actuable switches for selecting a desired coded chord. Signals associated with the actuated switches are temporarily stored and are indicative of the desired coded chord to be visually displayed. A further switch is activated to transfer the stored signals indicative of the desired coded chord to a decoding circuit. The decoded circuit feeds a memory system to select in a matrix the composite parts of the desired coded chord in accordance with a coded data signal sent to it by the decoder whereby the composite parts of the desired coded chord are visually indicated on a visual display element. The method of visually teaching the component part structure of musical coded chords comprises simply the step of selecting switches having coded marking thereon representative of musical notes in major and minor tones and corresponding to a desired coded chord for transferring a corresponding signal to a temporary storage circuit. A transfer switch is then depressed to obtain the visual indication of the composite parts of the desired coded chord for learning purposes.

U.S. Pat. No. 3,822,630, issued Jul. 9, 1974 to Leonard, concerns a music teaching aid based on the hands and scales degrees. The device teaches elementary musical relationships and notation particularly in regard to scale tones and chords uniquely associated with pre-known names and order of the user's fingers on both hands. The same numbering of the fingers, from left to right in each also teaches, by association, the first five degrees by the numerical name. The two hands are on a panel that also supports one of a set of strip inserts carrying, for example, treble and bass clef notation for a particular key signature and the first five, or lower five, notes or tones of that diationic scale. The student will have no difficulty in extrapolating the "mini-scale" of five tones to the full octave and then to octave above or below that are learned by use of the device. For teaching chords a pair of hands are provided with only three fingers on each hand that are denominated as Root, $3^{rd}$ and $5^{th}$ degree and also correlated as before with the fingers named in that same order.

U.S. Pat. No. 3,208,327, issued Sep. 28, 1965 to Allen, illustrates an instant piano picture chord course, which equips the student with chord charts and fingerless gloves, to which lettered tabs may be removably attached. The letters on the tabs correspond to the notes of the various chords on the charts.

What is needed is a simplified method for learning to play various triads and four finger chords on a keyboard and learning to make transitions between chords.

SUMMARY OF THE INVENTION

An object of the present invention is to provide a simplified method for learning chords on a keyboard instrument based on common basic relative finger positions for three (triads) and four finger chords on the keyboard by learning a small number of basic visual shapes based on linear connections between adjacent fingers on the keyboard including eight basic shapes for the thirty six triads in each octave and sixteen basic shapes for four finger chords covering all possible chords on the keyboard, chord trees by forming a family of chords from a single triad, and chord changes within families of chords by a simple finger change to make a transition from one chord to another changing from one basic shape to another.

Another object of the present invention is to provide a universally applied system for making chord transitions that will reduce the time necessary to learn to play the keyboard.

A further object of the present invention is to provide a simplified method for learning finger positioning for chords on a keyboard and for finger movements to new positions to make that provides all the requirements for learning and changing chords contained in the method of the present invention.

An additional object of the present invention is to allow a keyboard player to use the chord symbols normally used by guitar players to play, without the need to learn to read music.

A further object of the present invention is to use a unique formula to build chords and to change chords thereby greatly simplifying the learning process for playing a keyboard.

One more object of the present invention is to provide a visual representation of the shapes of chords that will also assist the student in forming chords in root and inverted forms.

In brief, the method of the present invention is a "rock style" keyboard learning method that will simplify the process of learning to play the keyboard. It will reduce greatly the time needed to learn to play. The keyboard player will use the chord symbols normally used by guitar players to play.

All the requirements for learning and changing chords is contained in the method of the present invention. Music theory may be added to enhance the process and create a greater understanding of the keyboard but is not needed as a prerequisite for playing.

The present invention provides a limited set of visual symbols which describe the fingering positions for all three finger chords (triads) within an octave and all four finger chords on a keyboard musical instrument, a "Chord Tree System" illustrating a family of chords generated from one triad, and a "Relative Chord System" for making a transition from one chord to the next chord in a song. It is only necessary to learn the fingering for the first chord in a song. After that the formula takes over and every subsequent chord is relative to the prior or preceding chord.

The present invention is based on the following principle:

There are seven (7) different notes in each key (1, 2, 3, 4, 5, 6, 7).

It takes three (3) non-adjacent notes to form a chord, e.g. (1, 3, 5).

Therefore after the first chord is formed, any other chord must use an adjacent note to each finger, moving one or more fingers each one note to the right or left or repeating one or more of the current notes by leaving one or two fingers in place on the notes.

The keyboard learning method of the present invention is designed for people who want to learn to play the keyboard but do not have the time to learn the conventional way. It could also be useful to non-keyboard musicians who want to learn basic harmony, lyricists who want to try their hand at composing, or people who already know how to play but do not understand the chord structure used in any non-classical keyboard style, including a rock style. They will be able to play diatonic progressions immediately and then move to more complex progressions.

The method of the present invention teaches how to build any chord relative to the chord currently being fingered. Changing from one chord to any other chord is based on the musical interval between the two chords.

There are twelve different notes in each octave (seven white key notes and five black key notes) and therefore it is possible to form twelve major triads, twelve minor triads and twelve diminished triads in each octave, one beginning on each note. This is a total of thirty-six triads. But there are only eight different relative fingering positions on the keys needed to form all thirty-six triads. These fingering positions in the method of the present invention are simply illustrated as linear interconnections between adjacent finger positions forming eight different linear shapes, herein called "Triad Shapes", which may also be illustrated by a series of black and white circles representing the black and white keys being fingered. By learning these eight "Triad Shapes" and then learning which triads share the same shape it is very easy to memorize chords.

The triad shapes are based on the actual linear relationship of adjacent fingers on different keys on the keyboard forming the triads while looking down on the keyboard so that the white keys form a lower linear array and the black keys form a higher linear array. A connection line between two adjacent fingers on two white keys is shown as a lower straight horizontal line and a connection line between two adjacent fingers on two black keys are shown as a higher straight horizontal line above the white key line. A connection line between two adjacent fingers with one on a white note and the other on a black note to the right of the white note is shown as a line angled upwardly to the right. A connection line between two adjacent fingers with one on a black note and the other on a white note to the right of the black note is shown as a line angled downwardly to the right. These linear connection lines showing the relative positions of the fingers in different triad positions on the keyboard form linear shapes illustrating the relative positions of the fingers forming the triads on the keyboard and are therefore called "Triad Shapes".

The dots represent the piano keys (black and white). Chords that have similar black and white key combinations are grouped. If three or more chords share the combination, it is called a regular chord and if less than three chords share the combination it is called irregular. By showing these similarities the number of chords that the student will have to learn is reduced.

The lines are a visual representation of a chord,

On the line _____ is a white key

Above the line / is a black key.

So a "V" shape would represent black, white, black as in Ab C Eb. These shapes will be written above the chord symbols on the music sheet to help in memorizing chords.

Regular and Irregular Triads

A triad will be termed regular if three or more major, minor, or diminished triads share the same "Triad Shape", and irregular if fewer than three triads share the same "Triad Shape".

Inversions

Chords are formed by stacking major (M), minor (m), diminished (d), and augmented (A) thirds, but they do not always have to be in root form.

The Triad Relationship

The diatonic chord relationship is well known and well documented, but the method of the present invention will introduce a new chord relationship called the "Triad Relationship."

In the "Triad Relationship" every chord is derived from one of the three basic triads: major, minor, and diminished. By raising or lowering notes a half step or one step several chords are formed.

The Chord Tree

To illustrate the "Triad Relationship" the method of the present invention uses a "Chord Tree," a family of chords that are generated from one triad. The present invention uses in part the system of the applicant's co-pending patent application Ser. No. 10/626,190, filed Jul. 23, 2003.

The method of the present invention introduces two new terms, the "merge" and the "split."

Merge: When a keyboard player makes a transition from a 4-note chord to a 3-note chord, two notes will usually resolve into one note, herein called a "merge."

Split: When a note is resolved by raising it and lowering it at the same time, as in making a transition from C major to Am6 or D9, the resolving is herein called a "split." In this instance the 5th of the C major triad, "G", is resolved down to F# and also up to A (C E G to C E F# A).

The Formula

By raising, lowering, merging and splitting notes in the triads any known chord may be formed from each triad and new harmonies developed.

An advantage of the present invention is that it will allow one to play the keyboard without the years of practice normally needed and without the need to sight-read music.

Another advantage of the present invention is that it will help people to learn to play any non-classical keyboard style, including a rock style, keyboard in a short time and without a lot of the music theory that is normally required.

An additional advantage of the present invention is that it will simplify the way that one learns to play the keyboard.

A further advantage of the present invention is that it provides all the requirements for learning and changing chords contained in the method of the present invention.

One more advantage of the present invention is that it will also reduce the time necessary to learn to play many of the popular songs that one hears.

Yet another advantage of the present invention is that it allows a person to learn to play the keyboard, prior to the frustration and subsequent abandonment of music lessons.

BRIEF DESCRIPTION OF THE DRAWINGS

These and other details of my invention will be described in connection with the accompanying drawings, which are furnished only by way of illustration and not in limitation of the invention, and in which drawings:

FIG. 1 is a list of all the triads and a schematic view of all the triad shapes in root form illustrated by a series of connected lines indicating the linear relationships between finger positions and also showing the finger positions in circles with a white circle representing a finger position on a white key and a black circle representing a finger position on a black key;

FIGS. 2A, 2B, and 2C are lists illustrating the chords in root form and also in inverted thirds with each finger position in the chord represented by a circle and the root of each chord indicated by an R in a circle and showing the chord tree method of stacking triads to form four finger chords;

FIGS. 3A, 3B, and 3C are lists illustrating some of the three-note chords and three-note substitutions for four-note chords that are formed by raising or lowering notes in the C major triad, in which a note can move UP (+) or DOWN (−) a half (½) tone or one (1) full tone, and an arrow indicates the direction in which the note moves to create the new chord in these chords related to the C major triad;

FIG. 4 is a list of some of the chords that are formed by splitting the root, or third, or fifth of the C major triad, wherein the arrow points both DOWN (←) and UP (→) indicating the note splits into two new notes to form the new chord;

FIG. 5A, FIG. 5B, and FIG. 5C are lists of some of the chords that are formed by splitting the root AND fifth, or root AND third, or third AND fifth of the C major triad, wherein when two notes of a triad split to form a new chord, the third note usually resolves into one of the new notes, maintaining the four-part harmony;

FIG. 6 is a list illustrating some of the three-note chords and three-note substitutions for four-note chords that are formed by raising or lowering notes in the A minor triad;

FIG. 7A and FIG. 7B are lists of some of the chords that are formed by splitting the root, or third, or fifth of the A minor triad;

FIG. 8A and FIG. 8B are lists of some of the chords that are formed by splitting the root AND fifth, or root AND third, or third AND fifth of the A minor triad;

FIGS. 9A, 9B and 9C are lists illustrating the six groups of four chord shapes of interconnected lines representing the linear connections between the fingers on the keys illustrating the combination of black and white keys that make up the chord, wherein each 4-note chord has four inversions, and col. 1 gives the root inversion and cols. 2, 3 and 4, the other three inversions, and wherein Group 4 chords have only two shapes for the four inversions and group 5 and group 6 have only one shape for all four inversions, so that there is a total of fifty-four shapes in the six groups, but there are only sixteen different shapes, as shown in the summary in FIGS. 9B and 9C, which sixteen shapes represent every 4-note chord on the keyboard;

FIGS. 10A-10B are lists of all the Group 1 chords by key from C major to B major, wherein all the chords in each key that fall into this group are listed and each chord is listed under the shape of the root inversion, and the other three shapes represent the other three inversions, from left to right, wrapping around;

FIGS. 11A-11B are lists summarizing the Group 1 chords and listing the number of chords in each chord type in this group and also giving an example of one of each of these chords;

FIGS. 12A-12B are lists by chord type of all the chords in Group 1 wherein each chord is listed under the root inversion;

FIG. 13 is a list of all the Group 2 chords by key;

FIGS. 14A-14B are lists summarizing the Group 2 chords;

FIG. 15 as a list by chord type of all the chords in Group 2;

FIG. 16 is a list of all the Group 3 chords by key;

FIGS. 17A-17B are lists summarizing the Group 3 chords;

FIGS. 18A-18B are lists by chord type of all the chords in Group 3;

FIGS. 19A-19B are lists of all the Group 4 chords by key;

FIGS. 20A-20B are lists summarizing the Group 4 chords;

FIGS. 21A-21B are lists by chord type of all the chords in Group 4;

FIGS. 22A-22B are lists of all the Group 5 chords by key;

FIG. 23 is a list of summarizing Group 5 chords;

FIGS. 24A-24B are lists by chord type of all the chords in Group 5;

FIG. 25 is a list of all the Group 6 chords by key;

FIG. 26 is a list illustrating a summary of Group 6 chords;

FIG. 27 is a list by chord type of all the chords in Group 6.

BEST MODE FOR CARRYING OUT THE INVENTION

Figure 9A:
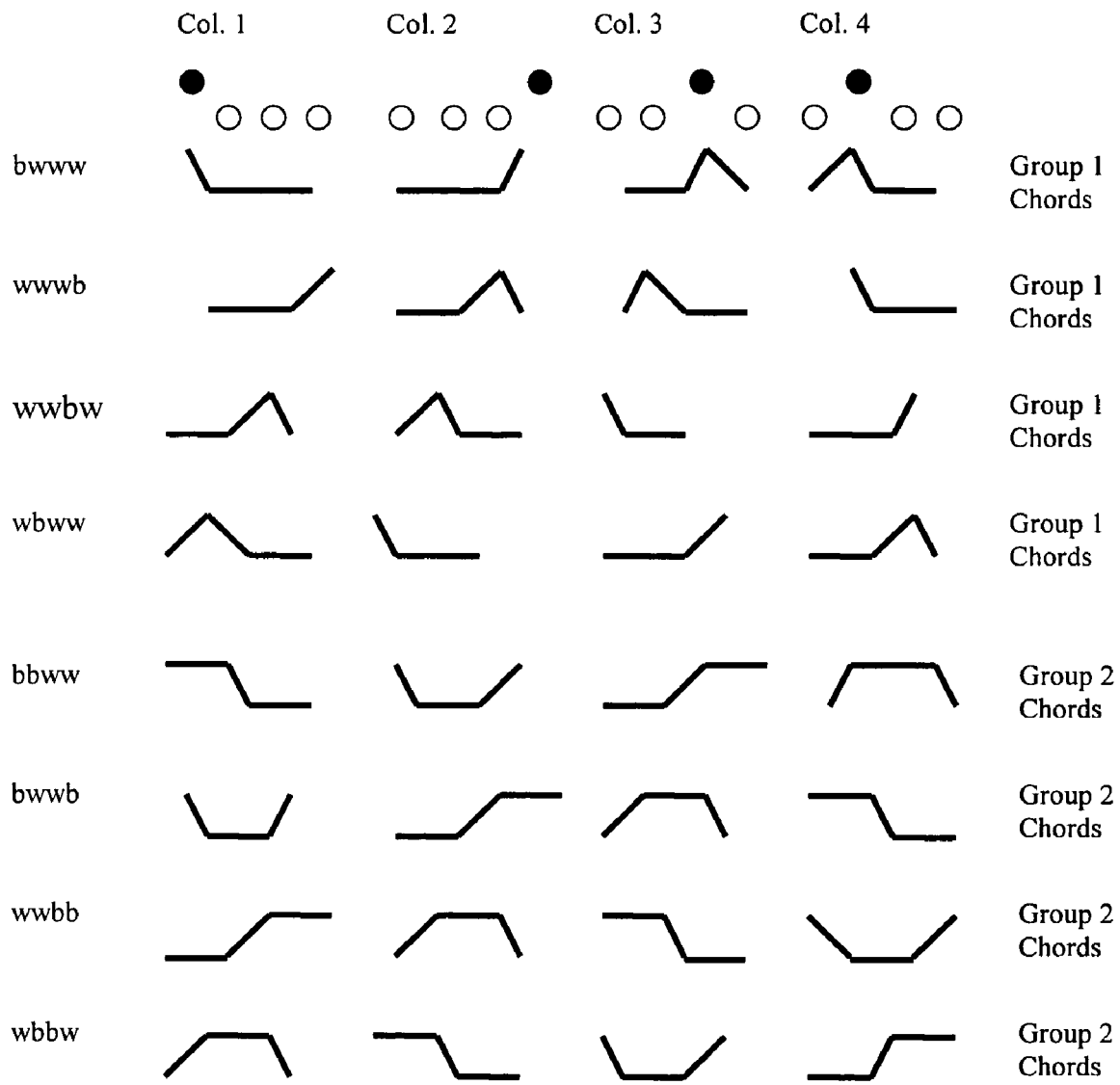

A simplified method for learning chords on a keyboard instrument based on common basic relative finger positions for three finger chords (triads) and four finger chords on the keyboard by learning a small number of basic visual shapes based on linear connections between adjacent fingers on the keyboard including eight basic shapes for the thirty six triads in each octave and sixteen basic shapes for four finger chords covering all possible chords on the keyboard, chord trees by forming a family of chords from a single triad, and chord changes within families of chords by a simple finger change to make a transition from one chord to another.

The method of learning chords and chord transitions on a keyboard using the simple shape configuration of joined straight horizontal and angled lines representing relative linear connections between the positions of adjacent fingers on a keyboard covers the shapes of the three main triads (Major, Minor and Diminished).

Triad Shapes

There are twelve different notes in each octave (seven white key notes and five black key notes) and therefore it is possible to form twelve major triads, twelve minor triads and twelve diminished triads in each octave, one beginning on each note. This is a total of thirty-six triads. But there are only eight different relative fingering positions on the keys needed to form all thirty-six triads. These fingering positions in the method of the present invention are simply illustrated as linear interconnections between adjacent finger positions forming eight different linear shapes herein called "Triad Shapes". By learning these eight "Triad Shapes" and then learning which triads share the same shape it is very easy to memorize chords.

The triad shapes are based on the actual linear relationship of adjacent fingers on different keys on the keyboard forming the triads while looking down on the keyboard so that the white keys form a lower linear array and the black keys form a higher linear array. In the triad shape diagrams of FIG. 1, a connection line between two adjacent fingers on two white keys is shown as a lower straight horizontal line and a connection line between two adjacent fingers on two black keys are shown as a higher straight horizontal line above the white key line. A connection line between two adjacent fingers with one on a white note and the other on a black note to the right of the white note is shown as a line angled upwardly to the right. A connection line between two adjacent fingers with one on a black note and the other on a white note to the right of the black note is shown as a line angled downwardly to the right. These linear connection lines showing the relative positions of the fingers in different triad positions on the keyboard form linear shapes illustrating the relative positions of the fingers forming the triads on the keyboard and are therefore called "Triad Shapes". Black circles above the "Triad Shapes'" indicated black keys and white circles above the "Triad Shapes" indicate white keys.

In practice, as seen in the two partial keyboard illustrations at the bottom of FIG. 1A, the linear shapes (such as the "Triad Shapes") are each imprinted above a corresponding chord symbol on a music sheet to help in learning finger positioning of chords on a musical keyboard, which are shown on the keyboard above each of the shapes with white circles for finger positions on white keys and black circles for finger positions on black keys.

Regular and Irregular Triads

A triad will be termed regular if three or more major, minor, or diminished triads share the same "Triad Shape", and irregular if fewer than three triads share the same "Triad Shape".

Inversions

Chords are formed by stacking major (M), minor (m), diminished (d), and augmented (A) thirds, but they do not always have to be in root form. FIGS. 2A, 2B, and 2C show the chords in root form and also in inverted thirds.

The Triad Relationship

The diatonic chord relationship is well known and well documented, but the method of the present invention will introduce a new chord relationship called the "Triad Relationship."

In the "Triad Relationship" every chord is derived from one of the three basic triads: major, minor, and diminished. By raising or lowering notes a half step or one step several chords are formed.

The Chord Tree

To illustrate the "Triad Relationship" the method of the present invention uses a "Chord Tree," a family of chords that are generated from one triad as shown in FIGS. 3A to 8B.

The method of the present invention introduces two new terms, the "merge" and the "split."

Merge: When a keyboard player makes a transition from a 4-note chord to a 3-note chord, two notes will usually resolve into one note, herein called a "merge."

Split: When a note is resolved by raising it and lowering it at the same time, as in making a transition from C major to Am6 or D9, the resolving is herein called a "split." In this instance the 5th of the C major triad, "G", is resolved down to F# and also up to A (C E G to CE F# A).

The Formula

By raising, lowering, merging and splitting notes in the triads any known chord may be formed and new harmonies developed.

The C Major Tree

Simple (3-note) Chords

FIGS. 3A, 3B, and 3C illustrate some of the three-note chords and three-note substitutions for four-note chords that are formed by raising or lowering notes in the C major triad. A note can move UP (+) or DOWN (−) a half (_) tone or one (1) full tone. The arrow indicates the direction in which the note moves to create the new chord. All these chords will be related to the C major triad. A chord can be derived from more than one tree.

Multi-Function Major Triad

A triad can also represent several chords by changing the bass note. The C major triad is Am7 with "A" bass, D11 with "D" bass, and Fmaj9 with "F" bass.

Full Chords

FIG. 4 gives a list of some of the chords that are formed by splitting the root, or third, or fifth of the C major triad. You will notice here that the arrow points both DOWN (←) and UP (→) indicating the note splits into two new notes to form the new chord.

FIG. 5A, FIG. 5B, and FIG. 5C give a list of some of the chords that are formed by splitting the root AND fifth, or root AND third, or third AND fifth of the C major triad. When two notes of a triad split to form a new chord, the third note usually resolves into one of the new notes, maintaining the four-part harmony.

The A Minor Tree

Simple (3-Note) Chords

FIG. 6 illustrates some of the three-note chords and three-note substitutions for four-note chords that are formed by raising or lowering notes in the A minor triad.

Full Chords

FIG. 7A and FIG. 7B give a list of some of the chords that are formed by splitting the root, or third, or fifth of the A minor triad.

FIG. 8A and FIG. 8B give a list of some of the chords that are formed by splitting the root AND fifth, or root AND third, or third AND fifth of the A minor triad.

Multi-Function Minor Triad

The A minor triad can also function as B11l9, C6, D9 or Dm9, Fmaj7, or F#m7-5.

Advanced Chord Shapes

There are hundreds of chords on the keyboard and to learn the all seem a daunting task. The present invention simplifies the process.

Chords are made up of four white keys, or four black keys, or a combination of four black and white keys. These keys form visual patterns (shapes) and these shapes will be used to make it easier to learn and memorize chords.

Chords can be divided into six groups based on the combination of black and white keys that make up the chord as follows:

Group 1 chords will be chords that are made up of one white key and three black keys (wbbb).

Group 2 chords will chords that are made up of two black keys and two white keys (bbww).

Group 3 chords will be chords that are made up of three black keys and one white key (bbbw)

Group 4 chords will be chords that are made up of one black key, one white key, one black key, one white key (bwbw).

Group 5 chords will be chords that that are made up of four white keys (wwww).

Group 6 chords will be chords that are made up of four black keys (bbbb).

FIGS. 9A, 9B and 9C show the six groups and give the shapes of the chords in each group. Each 4-note chord has four inversions, and col. 1 gives the root inversion and cols. 2, 3 and 4, the other three inversions. Group 4 chords have only two shapes for the four inversions and group 5 and group 6 have only one shape for all four inversions. There is a total of fifty-four shapes in the six groups, but on close analysis it is seen that there are only sixteen different shapes (see the summary on FIGS. 9B and 9C). These sixteen shapes will represent every 4-note chord on the keyboard. By learning these sixteen shapes one will be able to play hundreds of chords on the keyboard.

At the bottom of FIG. 9C, to further simplify the learning process, chords with four white keys which appear as a straight lower line can be represented by a series of four circles in a horizontal row representing the four fingers on the white keys and showing the spacing between adjacent finger positions. Form 1 represents skipping a key between all four keys played in the chord. Form 2 represents skipping a key between the first and second keys played and between the second and third keys played, but playing adjacent keys on the third and fourth keys played in the chord. Form 3 represents skipping a key between the first and second keys played and playing adjacent keys in the second and third keys played, and skipping a key between the third and fourth keys played in the chord. Form 4 represents playing adjacent keys in the first and second keys played, and skipping a key between the second and third and the third and fourth keys played in the chord. Form 5 represents playing adjacent keys in the first and second keys played, skipping a key between the second and third keys played, and playing adjacent keys on the third and fourth keys played in the chord.

In FIG. 10A to FIG. 27 thirty chord types are selected for analysis. These are chords that one would encounter in popular music.

FIG. 10A-10B lists all the Group 1 chords by key from C major to B major. All the chords in each key that fall into this group are listed. Each chord is listed under the shape of the root inversion, and the other three shapes represent the other three inversions, from left to right, wrapping around.

FIG. 11A-11B gives a summary of the Group 1 chords. It lists the number of chords in each chord type in this group and also gives an example of one of these chords.

FIG. 12A-12B list by chord type all the chords in Group 1. Each chord is listed under the root inversion.

FIG. 13 lists all the Group 2 chords by key.

FIG. 14A-14B gives a summary of Group 2 chords.

FIG. 15 list by chord type all the chords in Group 2.

FIG. 16 lists all the Group 3 chords by key.

FIG. 17A-17B gives a summary of Group 3 chords.

FIG. 18A-18B list by chord type all the chords in Group 3

FIG. 19A-19B lists all the Group 4 chords by key.

Figure 20A:

FIG. 20A-20B gives a summary of Group 4 chords.

Figure 21A:

FIG. 21A-21B list by chord type all the chords in Group 4.

FIG. 22A-22B lists all the Group 5 chords by key.

FIG. 23 gives a summary of Group 5 chords.

FIG. 24A-24B list by chord type all the chords in Group 5.

FIG. 25 lists all the Group 6 chords by key.

FIG. 26 gives a summary of Group 6 chords.

FIG. 27 list by chord type all the chords in Group 6.

Each chord shape will represent more than one chord name, so that by learning and understanding these sixteen shapes a keyboard player will be able to play hundreds of chords.

It is understood that the preceding description is given merely by way of illustration and not in limitation of the invention and that various modifications may be made thereto without departing from the spirit of the invention as claimed.

What is claimed is:

1. A visual method for learning finger positions on keys of a musical keyboard to form musical chords, the method comprising:

using a series of linear shapes each formed by interconnecting straight lines, each of the lines representing an actual linear relationship between adjacent finger positions on different keys on the musical keyboard as if looking down on the musical keyboard and visualizing a line between each pair of adjacent fingers positioned on the keys, the interconnected straight lines of each of the linear shapes representing the linear relationship between fingers positioned on the musical keyboard to form a musical chord, the series of linear shapes representing all of the shapes used in forming chords for a given number of finger positions on a given number of keys, the visual method adapted for use in learning finger positioning for all of a series of chords on the musical keyboard using a given number of fingers on a given number of keys by associating each of the series of linear shapes with a discrete number of chords formed by each of the fingering positions at different locations along the keyboard; and placing said linear shapes above the chord symbols on a music sheet, whereby a player can visualize the finger positions as each chord is played.

2. The visual method of claim 1 wherein a connection line between two adjacent fingers on two white keys is represented in the visual method as a lower straight horizontal line and a connection line between two adjacent fingers on two black keys is represented in the visual method as a higher straight horizontal line situated above the white key line, a connection line between two adjacent fingers with one finger on a white key and an adjacent finger to the right on a black key is represented in the visual method as a line angled upwardly to the right, and a connection line between two adjacent fingers with a finger on a black key and an adjacent finger to the right on a white key is shown as a line angled downwardly to the right, so that each of the linear shapes is a combination of straight lines selected from lower horizontal lines, higher horizontal straight lines, straight lines angled upwardly to the right, and straight lines angled downwardly to the right, the visual method adapted for learning to position two adjacent fingers on two white keys for a lower horizontal line, two adjacent fingers on two black keys for a higher horizontal line, two adjacent fingers with a left finger on a white key and a right finger on a black key for a straight line angled upwardly to the right, and two adjacent fingers with a left finger on a black key and a right finger on a white key for a straight line angled downwardly to the right.

3. The visual method of claim 1 wherein each one of the linear shapes of the series of linear shapes comprises two interconnected lines representing the finger positioning configuration of a three finger triad chord, the method adapted for learning finger positioning for triad chords on the musical keyboard.

4. The visual method of claim 3 wherein the series comprises a total of eight linear shapes representing all of the finger positioning configurations of the triad chords, the method adapted for using the total of eight linear shapes to learn finger positioning for all of the finger positioning configurations of the triad chords.

5. The visual method of claim 1 wherein each one of the linear shapes of the series of linear shapes comprises three interconnected lines representing the finger positioning configuration of a four finger chord, the method adapted for learning finger positioning for four finger chords on the musical keyboard.

6. The visual method of claim 5 wherein the series comprises a total of sixteen linear shapes representing all of the finger positioning configurations of the four finger chords, the method adapted for using the total of sixteen linear shapes to learn finger positioning for all of the finger positioning configurations of the four finger chords.

7. The visual method of claim 2 further comprising visual symbols representing finger positions on black and white keys with spacing between the visual symbols indicating spacing between adjacent keys, which visual symbols may be used in conjunction with the linear shapes by positioning each of the visual symbols at an end of each line in a linear shape.

8. The visual method of claim 2 wherein the linear shapes are each imprinted above a corresponding chord symbol on a music sheet to help in learning finger positioning of chords on the musical keyboard.

9. A visual method for learning finger positions on keys of a musical keyboard to form musical chords, the method comprising:

learning finger positioning for chords on the musical keyboard using a series of linear shapes each formed by interconnecting straight lines, each of the lines representing an actual linear relationship between adjacent finger positions on different keys on the musical keyboard as if looking down on the musical keyboard and visualizing a line between each pair of adjacent fingers positioned on the keys, the interconnected straight lines of each of the linear shapes representing the linear relationship between fingers positioned on the musical keyboard to form a musical chord, the series of linear shapes representing all of the shapes used in forming chords for a given number of finger positions on a given number of keys, the visual method comprising learning finger positioning for all of a series of chords on the musical keyboard using a given number of fingers on a given number of keys by associating each of the series of linear shapes with a number of chords formed by each of the fingering positions at different location along the keyboard.

10. The visual method of claim 9 further comprising learning finger positioning for chords on the musical keyboard wherein a connection line between two adjacent fingers on two white keys is represented in the visual method as a lower straight horizontal line and a connection line between two adjacent fingers on two black keys is represented in the visual method as a higher straight horizontal line above the white key line, a connection line between two adjacent fingers with one finger on a white key and an adjacent finger to the right on a black key is represented in the visual method as a line angled upwardly to the right, and a connection line between two adjacent fingers with a finger on a black key and an adjacent finger to the right on a white key is shown as a line angled downwardly to the right, so that each of the linear shapes is a combination of straight lines selected from lower horizontal lines, higher horizontal straight lines, straight lines angled upwardly to the right, and straight lines angled downwardly to the right, the visual method comprising learning to position two adjacent fingers on two white keys for a lower horizontal line, two adjacent fingers on two black keys for a higher horizontal line, two adjacent fingers with a left finger on a white key and a right finger on a black key for a straight line angled upwardly to the right, and two adjacent fingers with a left finger on a black key and a right finger on a white key for a straight line angled downwardly to the right.

11. The visual method of claim 10 further comprising learning finger positioning for triad chords by positioning three fingers on the musical keyboard by simulating the positioning represented by each one of the linear shapes of a series of linear shapes each comprising two interconnected lines representing the finger configurations of a three finger triad chord.

12. The visual method of claim 11 further comprising learning finger positioning for triad chords by positioning three fingers on the musical keyboard for each of eight different positions simulating the positioning represented by a series of a total of eight linear shapes representing all of the finger configurations of the triad chords.

13. The visual method of claim 9 further comprising learning finger positioning for four finger chords by positioning four fingers on the musical keyboard by simulating the positioning represented by each one of the linear shapes of a series of linear shapes comprising three interconnected lines representing the finger configuration of a four finger chord.

14. The visual method of claim 13 further comprising learning finger positioning for four finger chords by positioning four fingers on the musical keyboard for each of sixteen different positions simulating the positioning represented by a series of a total of sixteen linear shapes representing all of the finger configurations of the four finger chords.

15. The visual method of claim 10 further comprising visual symbols representing finger positions on black and white keys with spacing between the visual symbols indicating spacing between adjacent keys, which visual symbols may be used in conjunction with the linear shapes by positioning each of the visual symbols at an end of each line in a linear shape.

16. The visual method of claim 10 wherein the linear shapes are each imprinted above a corresponding chord symbol on a music sheet to help in learning finger positioning of chords on the musical keyboard.

17. A simplified method of learning to make finger positioning transitions between chords on a musical keyboard, the method comprising:
a first step of positioning a number of fingers on the musical keyboard with each finger on a specific first key to form a first chord and depressing the first keys to play the first chord;
a second step of forming a second chord by moving at least one finger to an adjacent second key, and leaving at least one finger in place on at least one of the first keys of the first chord and depressing the second chord keys to play the second chord.

18. The simplified method of claim 17 wherein the first chord comprises a triad formed by three finders on three first keys, and further comprising a step of adding chord trees by forming a family of chords from a single triad, and chord changes within families of chords by a simple finger change to make a transition from one chord to another.

19. The simplified method of claim 17 wherein the triad comprises a triad selected from the three main triads including a Major Triad, a Minor Triad, and a Diminished Triad.

20. The simplified method of claim 17 wherein the finger change comprises raising or lowering notes a half step or one step to form one of several new chords.

21. A simplified method of learning finger positioning to form all possible chords on a musical keyboard, the method comprising:
a first step of positioning three fingers on any combination of three separate keys of the musical keyboard to form one of all possible triad chords and pressing down the keys to play the triad chord;
a second step of generating a chord tree forming a family of chords from each of the triad chords and forming any known chord by creating a chord tree from all of the triad chords by changing at least one finger position in each triad chord to create at least one note change selected from the list of note changes including raising a note, lowering a note, merging two notes into one note, and splitting a note into two notes to form a new chord and develop new harmonies.

* * * * *